United States Patent
Fukunaga et al.

(10) Patent No.: US 11,362,399 B2
(45) Date of Patent: Jun. 14, 2022

(54) POLYOLEFIN MICROPOROUS MEMBRANE, SEPARATOR FOR ELECTRICITY STORAGE DEVICES, AND ELECTRICITY STORAGE DEVICE

(71) Applicant: Asahi Kasei Kabushiki Kaisha, Tokyo (JP)

(72) Inventors: Yuki Fukunaga, Tokyo (JP); Manabu Sekiguchi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 56 days.

(21) Appl. No.: 16/613,240

(22) PCT Filed: May 25, 2018

(86) PCT No.: PCT/JP2018/020248
§ 371 (c)(1),
(2) Date: Nov. 13, 2019

(87) PCT Pub. No.: WO2018/216819
PCT Pub. Date: Nov. 29, 2018

(65) Prior Publication Data
US 2020/0176742 A1 Jun. 4, 2020

(30) Foreign Application Priority Data
May 26, 2017 (JP) .............................. JP2017-104586

(51) Int. Cl.
*H01M 50/446* (2021.01)
*H01G 11/52* (2013.01)
(52) U.S. Cl.
CPC .......... *H01M 50/446* (2021.01); *H01G 11/52* (2013.01)

(58) Field of Classification Search
None
See application file for complete search history.

(56) References Cited

U.S. PATENT DOCUMENTS

2012/0015229 A1   1/2012   Ohashi et al.
2012/0094167 A1   4/2012   Samii et al.
(Continued)

FOREIGN PATENT DOCUMENTS

JP   2008-218085 A   9/2008
JP   2009-242631 A   10/2009
(Continued)

OTHER PUBLICATIONS

International Search Report issued in corresponding International Patent Application No. PCT/JP2018/020248 dated Aug. 14, 2018.
(Continued)

*Primary Examiner* — Daniel S Gatewood
(74) *Attorney, Agent, or Firm* — Morgan, Lewis & Bockius LLP

(57) ABSTRACT

According to the present invention, a microporous membrane contains a polyolefin resin and inorganic particles; the primary particle diameter of the inorganic particles is 100 nm or less; the content of the inorganic particles is 10-60% by mass or 10% by mass or more but less than 40% by mass based on the mass of the microporous membrane; and the retention time at 150° C. is less than 200 seconds or the retention time at 145° C. is more than 1 second but less than 300 seconds in the thermal behavior evaluation of the microporous membrane.

16 Claims, 7 Drawing Sheets

(56) References Cited

U.S. PATENT DOCUMENTS

2015/0372277 A1* 12/2015 Honda ................. H01M 50/40
429/145
2016/0181584 A1   6/2016 Hatayama et al.

FOREIGN PATENT DOCUMENTS

| JP | 2009-266808 A |   | 11/2009 |
|----|---------------|---|---------|
| JP | 2009266808 A  | * | 11/2009 |
| JP | 2011-249240 A |   | 12/2011 |
| JP | 2015-018813 A |   | 1/2015  |

OTHER PUBLICATIONS

International Preliminary Report on Patentability and Written Opinion issued in corresponding International Patent Application No. PCT/JP2018/020248 dated Dec. 5, 2019.
Supplementary European Search Report issued in corresponding European Patent Application No. 18805698.0 dated Mar. 12, 2020.

* cited by examiner (A)

(B)

(C)

(D)

(E)

(F)

POLYOLEFIN MICROPOROUS MEMBRANE, SEPARATOR FOR ELECTRICITY STORAGE DEVICES, AND ELECTRICITY STORAGE DEVICE

FIELD

The present invention relates to a polyolefin microporous membrane, a separator for electricity storage devices, and an electricity storage device.

BACKGROUND

A polyolefin microporous membrane (hereinafter often referred to simply as "PO microporous membrane") is widely used as a separator of various substances, a permselective separation membrane, a separator material, etc. The applications thereof include, for example, microfiltration membranes; separators for batteries such as lithium ion batteries, fuel cells, etc.; separators for capacitors; base materials of functional membranes having pores filled with functional materials, that produce novel functions, etc. Among these, the PO microporous membrane is suitably used as a separator for lithium ion batteries widely used in a notebook personal computer (PC), cellular phone, tablet PC, digital camera, etc.

In recent years, applications of electricity storage devices such as lithium ion batteries, etc., have been expanded and these devices have been used for industrial purposes such as automobiles or construction equipment. Therefore, high output of a cell, i.e., release of a large amount of energy in a short time has been required. Furthermore, the specification for these applications require an increase in the size of the cell, and it has also been of importance to secure security. For higher output, reduction of an internal resistance of the cell and increase in a diffusion rate of ions in an electrolytic solution, have been required. In regard to battery safety, it has been required to prevent ignition or explosion due to thermal runaway even when a device equipped with a battery is exposed to an extremely elevated temperature due to an accident, etc. One of the safety evaluation methods assuming such a situation is an oven heating test, and there has been a growing proposition of research and development to ensure security in the oven heating test.

Moreover, vehicle onboard lithium-ion batteries are sometimes loaded on the bottom of a vehicle body, and there may occur a case in which a vehicle while being driven on a road accidentally hits a foreign body and it has become stuck in the battery. A nail puncture test has been proposed as one of the safety evaluation methods assuming such a situation, and ensuring security in the nail puncture test has also been a proposition of research and development.

On the other hand, for vehicle onboard lithium ion batteries, it has been required to maintain the performance in a certain elevated temperature environment such as use in an engine room or in a region where the temperature is elevated, etc.

Ignition or explosion in the oven heating test is attributed to Joule heat due to a large current when short-circuiting occurs between a plurality of electrodes in an elevated temperature environment. Therefore, when the cell temperature rises, it is required to instantaneously insulate between electrodes to reduce a short-circuit current, or to increase a short-circuit area to distribute the current and suppress generation of Joule heat.

Ignition or explosion in the nail puncture test is caused by the elevated temperature around the nail due to the Joule heat generated by a current when the punctured nail brings about short-circuit between the electrodes. Therefore, when the temperature around the nail rises, it is required to instantaneously insulate between electrodes to reduce a short-circuit current, or to increase a short-circuit area to disperse the current and suppress generation of Joule heat.

When the battery temperature exceeds 150° C. and reaches such an elevated temperature, the electrolytic solution begins to decompose followed by thermal runaway of the battery, and therefore, it is necessary to stop heat generation at a temperature below 150° C.

However, as a battery has progressed in terms of high output in recent years, a separator with high porosity tends to be used in order to reduce the resistance of the separator. Thus, even if the separator is melted in an elevated temperature environment, there may be a case where an area sufficient to separate between the electrodes cannot be obtained.

On the other hand, with regard to maintaining performance in the elevated temperature environment, a membrane generally begins to melt in the vicinity of a melting point of the resin constituting a separator followed by increase in internal resistance, which decreases a battery capacity.

In view of the above, when a temperature of the cell rises, the separator needs not to melt up to the vicinity of the melting point, to be excellent in cycle characteristics or output characteristics even in an elevated temperature environment, and instantaneously to undergo short-circuit in a large area in a temperature range exceeding the melting point, which ensures safety of the cell.

Patent Document 1 discloses a PO microporous membrane containing inorganic particles having a nano-sized particle diameter from the viewpoint of safety insurance and performance such as output, etc., under an elevated temperature environment. Patent Document 1 also discloses an invention in which heat resistance is improved by increasing crystallinity with inclusion of the inorganic particles.

PATENT DOCUMENTS

[Patent Document 1] Japanese Unexamined Patent Publication (Kokai) No. 2011-249240

DISCLOSURE OF THE INVENTION

Problems to be Solved by the Invention

However, the highly porous PO microporous membrane containing inorganic particles as described in Patent Document 1 cannot maintain cycle characteristics and output characteristics since the pores clog up under an elevated temperature environment such as the vicinity of the melting point. Further, even if the temperature reaches 150° C. exceeding the melting point, the separator described in Patent Document 1 does not begin to melt, which raises a problem of not enabling to bring about short-circuit in a large area between a plurality of electrodes.

In light of the above problems, an object of the present invention is to provide a polyolefin microporous membrane that is superior in performance under a temperature environment in the vicinity of the melting point when the membrane is used for a separator for lithium ion secondary batteries and other electrochemical devices, and is capable of securing safety by instantaneously leading to short-circuit between a plurality of electrodes when the cell generates heat up to a temperature range exceeding the melting point;

a separator for electricity storage devices consisting of the polyolefin microporous membrane; and an electricity storage device using the separator for electricity storage devices.

Means for Solving the Problem

The present inventors have carried out much diligent experimentation with the aim of solving the problems described above. As a result, the present inventors have found that a microporous membrane having a specific amount of an inorganic substance hardly clogs up pores and maintains performance thereof even though reaching a temperature range exceeding a melting point of a normal PO microporous membrane, for example, a melting point of the microporous membrane or a temperature of the melting point of the microporous membrane plus 10° C., etc. Furthermore, the present inventors have found that the problem can be solved by a PO microporous membrane that is instantaneously melted under an elevated temperature environment where a cell triggers an abnormal thermal generation in a temperature such as the melting point of the microporous membrane plus 10° C. or higher or the melting point of the microporous membrane plus 15° C. or higher, etc., (for example, 145° C. or 150° C.), and thus have completed the present invention. Namely, the present invention is as follows:

[1] A microporous membrane comprising a polyolefin resin and inorganic particles, wherein the inorganic particles have a primary particle diameter of 100 nm or less, the content of the inorganic particles is 10 to 60% by weight based on the weight of the microporous membrane, and a retention time at 150° C. is less than 200 seconds in the following thermal behavior evaluation (1) of the microporous membrane:

thermal behavior evaluation (1) whereby under a condition of an initial load of 0.0098N (1.0 gf), thermomechanical analysis (TMA) of the microporous membrane is carried out by increasing a temperature of the microporous membrane from 30° C. to 150° C. at a rising rate of 10° C./minute in a constant length mode, and subsequently holding at 150° C. for 10 minutes, provided that in the thermomechanical analysis (TMA), a time after reaching 150° C. until a shrinkage stress of the microporous membrane falls less than 0.0098N (1.0 gf) is regarded as a retention time at 150° C., a moment of the shrinkage stress being less than 0.0098N (1.0 gf) is regarded as breakage of the microporous membrane, and the retention time at 150° C. is used as an index for the thermal behavior evaluation (1).

[2] A microporous membrane comprising a polyolefin resin and inorganic particles, wherein the inorganic particles have a primary particle diameter of 100 nm or less, the content of the inorganic particles is 10% by weight or more and less than 40% by weight based on the weight of the microporous membrane, and a retention time at 145° C. is more than 1 second and less than 300 seconds in the following thermal behavior evaluation (2) of the microporous membrane:

thermal behavior evaluation (2) whereby under a condition of an initial load of 0.0098N (1.0 gf), thermomechanical analysis (TMA) of the microporous membrane is carried out by increasing a temperature of the microporous membrane from 30° C. to 145° C. at a rising rate of 10° C./minute in a constant length mode, and subsequently holding at 145° C. for 10 minutes, provided that in the thermomechanical analysis (TMA), a time after reaching 145° C. until a shrinkage stress of the microporous membrane falls less than 0.0098N (1.0 gf) is regarded as a retention time at 145° C., a moment of the shrinkage stress being less than 0.0098N (1.0 gf) is regarded as breakage of the microporous membrane, and the retention time at 145° C. is used as an index for the thermal behavior evaluation (2).

[3] The microporous membrane according to [2], wherein in the thermal behavior evaluation (2), the retention time at 145° C. is 5 seconds or longer and less than 100 seconds.

[4] The microporous membrane according to any one of [1] to [3], wherein a kinetic coefficient of friction of the microporous membrane in MD or TD is 0.25 or more and 0.7 or less.

[5] The microporous membrane according to any one of [1] to [4], wherein an air permeability is 2 s/100 cc/μm or more and less than 6 s/100 cc/μm.

[6] The microporous membrane according to any one of [1] to [5], wherein a thermal shrinkage in TD at 120° C. is −2% or more and 5% or less.

[7] The microporous membrane according to any one of [1] to [6], wherein a ratio (Rmelt/R35) of an alternating current electrical resistance (Rmelt) when the microporous membrane is held for 30 minutes at a melting point of the microporous membrane to an alternating current electrical resistance at 35° C. (R35) is 0.7 or more and 2.5 or less.

[8] The microporous membrane according to any one of [1] to [7], wherein a ratio (Rmelt+10/R35) of an alternating current electrical resistance (Rmelt+10) when the microporous membrane is held for 1 hour at a temperature of 10° C. higher than a melting point of the microporous membrane to an alternating current electrical resistance at 35° C. (R35) is 0.7 or more and 3.0 or less.

[9] The microporous membrane according to any one of [1] to [8], wherein the polyolefin resin is polyethylene or a mixture of polyethylene and polypropylene.

[10] The microporous membrane according to any one of [1] to [9], wherein the polyolefin resin contains at least one selected from the group consisting of:

polyethylene having a viscosity-average molecular weight of less than 1,000,000 and ultrahigh molecular weight polyethylene having a viscosity-average molecular weight of 1,000,000 or more and a density of 0.942 g/cm$^3$ or less.

[11] The microporous membrane according to [10], containing polypropylene as the polyolefin resin.

[12] The microporous membrane according to any one of [1] to [11], wherein a primary particle diameter of the inorganic particles is greater than 7 nm.

[13] The microporous membrane according to [1] to [12], which is used in a separator for electricity storage devices.

[14] A separator for electricity storage devices, comprising the microporous membrane according to any one of [1] to [13].

[15] The separator for electricity storage devices according to [14], comprising an inorganic coating layer or an adhesive layer which is disposed at least on one side of the microporous membrane.

[16] A wound body of the separator for electricity storage devices according to [14] or [15].

[17] An electrochemical device, containing the separator for electricity storage devices according to [14] or [15].

[18] An electrochemical device, containing the wound body according to [16].

Effects of the Invention

The present invention enables to provide a novel PO microporous membrane that is excellent in performance thereof under an elevated temperature environment exceeding melting points of conventional PO microporous membranes when a separator for lithium ion secondary batteries and other electrochemical devices is formed, and imparts high safety in a more elevated temperature range where there is a risk of ignition and explosion.

BRIEF DESCRIPTION OF DRAWINGS

FIGS. 1 (D) and (E) are cross-sectional views showing an inorganic coating layer or adhesive layer located on different sides of the microporous membrane and FIG. 1 (F) is a cross-sectional view showing an inorganic coating layer or adhesive layer located on both sides of the microporous membrane.

MODE FOR CARRYING OUT THE INVENTION

Figure 1:
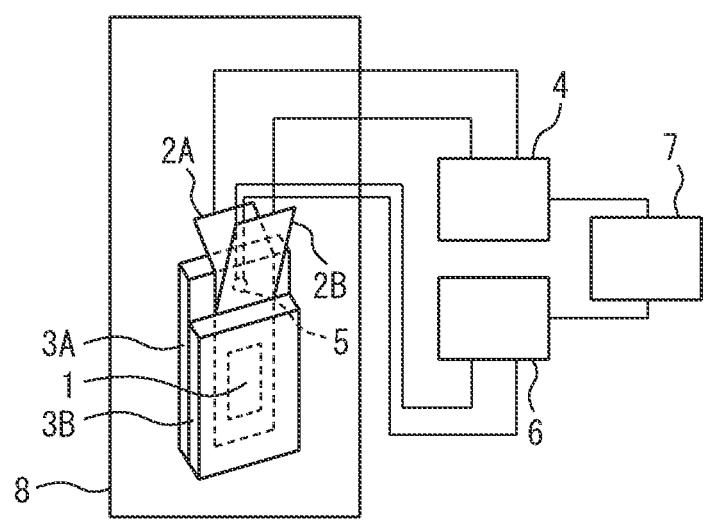
FIG. 1 (A) is a schematic diagram illustrating a measurement device of an alternating current electrical resistance, FIG. 1 (B) a schematic diagram explaining a microporous membrane fixed on a nickel foil in measurement of an alternating current electrical resistance, and FIG. 1 (C) is a schematic diagram explaining masking of the nickel foil in the measurement of an alternating current electrical resistance.
Figure 1:
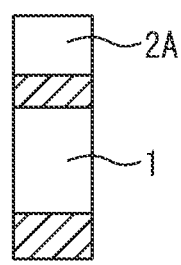
Figure 1:
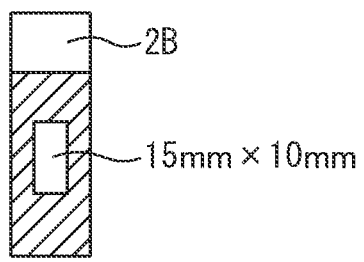
Figure 1:
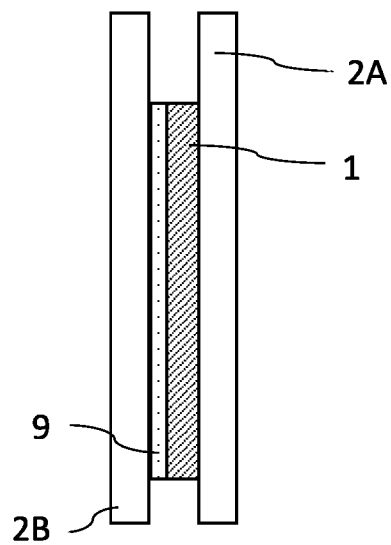
Figure 1:
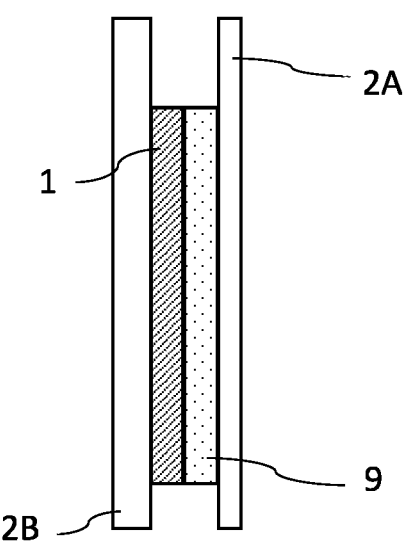
Figure 1:
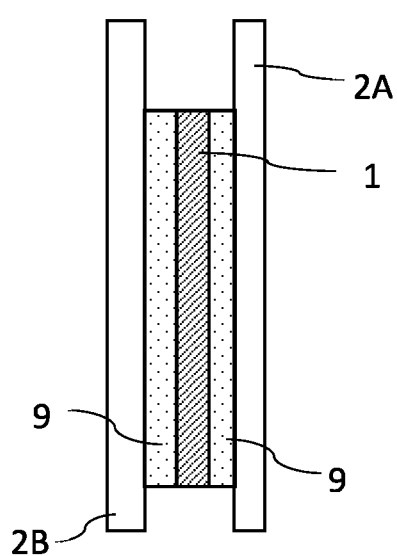

Embodiments for carrying out the invention (hereunder often referred to as "the present embodiment") will now be explained in detail below. It is to be understood, however, that the present invention is not limited to the following embodiments and may be implemented with appropriate modifications within the scope of its gist.

<Thermal Behavior Evaluation (1) by TMA>

Thermal behavior evaluation of the microporous membrane according to the present embodiment in thermomechanical analysis (TMA) was carried out under the condition of an initial load of 0.0098N (1.0 gf), by raising a temperature of the microporous membrane from 30° C. to 150° C. at a rising rate of 10° C./minute in a constant length mode, and subsequently holding at 150° C. for 10 minutes. Here, the time after reaching 150° C. until a shrinkage stress of the microporous membrane falls less than 0.0098N (1.0 gf) is regarded as a retention time at 150° C. A moment of the shrinkage stress being less than 0.0098N (1.0 gf) is regarded as breakage of the microporous membrane, and the retention time is used as an index for the thermal behavior evaluation (1).

<Thermal Behavior Evaluation (2) by TMA>

Thermal behavior evaluation of the microporous membrane according to the present embodiment in thermomechanical analysis (TMA) was carried out under the condition of an initial load of 0.0098N (1.0 gf), by increasing a temperature of the microporous membrane from 30° C. to 145° C. at a rising rate of 10° C./minute in a constant length mode, and subsequently holding at 145° C. for 10 minutes. Here, the time after reaching 145° C. until a shrinkage stress of the microporous membrane falls less than 0.0098N (1.0 gf) is regarded as a retention time at 145° C. A moment of the shrinkage stress being less than 0.0098N (1.0 gf) is regarded as breakage of the microporous membrane, and the retention time is used as an index for the thermal behavior evaluation (2).

The retention time of the microporous membrane of the present embodiment at 150° C. is less than 200 seconds, preferably less than 190 seconds, and more preferably less than 180 seconds. This assumes that the retention at 150° C. in the thermal behavior evaluation (1) is to have been exposed to a temperature environment in which a battery ignites or explodes. Therefore, in the thermal behavior evaluation (1), the short retention time at 150° C. means that the resin composition portion of a separator is rapidly melted in an elevated temperature environment where the battery ignites or explodes, and instantly undergoes short-circuit in a large area, which is therefore considered to enable to disperse a current generated by the short-circuit and suppress generation of Joule heat. From such a viewpoint, in the thermal behavior evaluation (1), the retention time of the microporous membrane according to the present embodiment at 150° C. can be less than 0 seconds. From the viewpoint of a cycle test and high-temperature output test, the retention time of the microporous membrane at 150° C. is preferably 0 seconds or more.

In order for the retention time at 150° C. to be within the range of less than 200 seconds, it is necessary to render the content of inorganic particles in the microporous membrane within an optimum range. When the content of the inorganic particles is large, the flowability when the separator is melted is lowered due to the interaction between a plurality of inorganic particles, and the increase in the short-circuit area may be inhibited. Here, the optimum range of the content of the inorganic particles is 10 to 60% by weight based on the weight of the microporous membrane. Further, even when the inorganic particles cannot be dispersed uniformly, the heat resistance at the location where the inorganic particles are localized is increased, inhibiting an increase in the short-circuit area.

The retention time of the microporous membrane of the present embodiment at 145° C. is less than 300 seconds, preferably less than 200 seconds, and more preferably less than 100 seconds. This is based on the assumption that the retention at 145° C. in the thermal behavior evaluation (2) is a process until a battery reaches a temperature environment where ignition or explosion occurs. Therefore, in the thermal behavior evaluation (2), the short retention time at 145° C. means that the resin composition portion of a separator is rapidly melted and instantly undergoes short-circuit in a large area until the battery reaches an elevated temperature environment where the battery ignites or explores, which is considered to disperse a current generated by the short-circuit and suppress generation of Joule heat. Moreover, in the thermal behavior evaluation (2), the retention time of the microporous membrane at 145° C. enables to exceed 1 second, for example, 5 seconds or longer, 6 seconds or longer, 7 seconds or longer, or 10 seconds or longer, etc.

In order for the retention time at 145° C. to be within the range of less than 300 seconds, the content of the inorganic particles in the microporous membrane should be in an optimal range and the set temperature in the heat setting process should be in an optimal range. Moreover, it is necessary to include an optimal range of resins having a viscosity-average molecular weight of less than 1,000,000. When the content of the inorganic particles is large, the flowability when the microporous membrane is melted is lowered due to the interaction between a plurality of inorganic particles, which may inhibit the increase in the short-circuiting area. Here, the optimum range of the content of the inorganic particles is 10% by weight or more and less than 40% by weight based on the weight of the microporous membrane. When the heat setting temperature in the heat setting step is high, crystallinity of the resin increases, and a melting start temperature of the resin also increases, which tends to increase a short-circuiting temperature. Here, the optimum range of the heat setting temperature is a melting point minus 10° C. or higher and lower than the melting point. When the content of the resin having a viscosity-average molecular weight of 1,000,000 or more is large, the flowability when the microporous membrane is melted is lowered, and the increase in the short-circuit area may be inhibited. Here, the optimum range of the content of the resin having a viscosity-average molecular weight of less than 1,000,000 is 70% by weight or more based on the weight of the resin in the microporous membrane.

Moreover, as for a laminate, in the case that a plurality of microporous membranes is laminated, a microporous membrane and other layers such as an inorganic coating layer and/or an adhesive layer are laminated, or a plurality of microporous membranes and other layer are laminate, one microporous membrane is taken out from the laminate, and subjected to the thermal behavior evaluations (1) and/or (2) by TMA.

<Measurement of Alternating Current Electrical Resistance at 35° C. and Alternating Current Electrical Resistance at Melting Point>

The microporous membrane according to the present embodiment has a ratio (Rmelt/R35) of an alternating current electrical resistance Rmelt (30 minutes) or Rmelt (1 hour) when the microporous membrane is held for 30 minutes or 1 hour at a melting point thereof, respectively, to an alternating current electrical resistance at 35° C. (R35), which is preferably 2.5 or less and more preferably 2.0 or less (refer to the following Example for the measurement method). Further, the ratio (Rmelt/R35) can be 0.5 or more or 0.7 or more.

Moreover, the microporous membrane according to the present embodiment has a ratio ((Rmelt+10)/R35) of an alternating current electrical resistance (Rmelt+10) that is measured in the same manner as (Rmelt) when the microporous membrane is held for 1 hour at a temperature of 10° C. higher than a melting point thereof, to an alternating current electrical resistance at 35° C. (R35), which is preferably 3.0 or less and more preferably 2.5 or less (refer to the following Example for the measurement method). The ratio ((Rmelt+10)/R35) can be 0.5 or more or 0.7 or more.

The Rmelt/R35 and (Rmelt+10)/R35 each can be considered as a ratio of increase in an alternating current electrical resistance when heated from 35° C. that is considered to be a normal battery operating temperature, to a melting point of the microporous membrane and to the melting point plus 10° C., respectively. The Rmelt/R35 in the range of 2.5 or less means that the ionic conduction of the separator is hardly hindered even if the temperature is raised to the vicinity of the melting point at which the microporous membrane is melted.

Moreover, at the melting point plus 10° C., which is a temperature range exceeding the melting point, there is a more likelihood of closing up pores of the microporous membrane than in the vicinity of the melting point, facilitating to increase the alternating current electrical resistance. Namely, the (Rmelt+10)/R35 in the range of 3.0 or less means that the increase in the alternating current electrical resistance is suppressed even under more severe conditions.

When a lithium ion battery is fabricated using the microporous membrane as a separator having Rmelt/R35 and/or (Rmelt+10)/R35 in the ranges described above respectively, the cycle characteristics and rate characteristics at elevated temperatures are excellent.

In order to adjust the Rmelt/R35 and (Rmelt+10)/R35 to the above ranges, it is necessary to uniformly disperse the inorganic particles contained in the PO microporous membrane. The uniform dispersion is considered to associate with the condition of a method for adding a plasticizer upon melt-kneading, etc.

It is noted that the measurement methods of a melting point and alternating current electrical resistance of the microporous membrane were carried out by the methods to be described in the Example below.

Moreover, the melting point of the microporous membrane refers to the temperature indicated by the maximum peak value in the second temperature rise in DSC (Differential Scanning calorimetric) measurement.

<Measurement of Heat Shrinkage in TD at 120° C.>

The microporous membrane in the present embodiment has a heat shrinkage in TD (direction intersecting with MD (flow direction of a membrane upon membrane processing) at an angle of 90° in the membrane plane) when held at 120° C. for 1 hour, which is preferably 5% or less, and more preferably 4% or less (refer to the Example below for the measurement method). The lower limit of the heat shrinkage in TD when held at 120° C. for 1 hour is −5% or more, −2% or more, −1% or more, or 0% or more from the viewpoint of a complementary relationship with the heat shrinkage in MD.

The separator in the present embodiment contains 10 to 60% by weight of inorganic particles having a primary particle diameter of 100 nm or less, preferably 10 to 40% by weight, more preferably 10 to 30% by weight, and still more preferably 10 to 20% by weight. The primary particle diameter of the inorganic particles contained in the separator can be greater than 7 nm, 10 nm or more, or 15 nm or more. Moreover, the primary particle diameter of the inorganic particles contained is 100 nm or less, more preferably 50 nm or less, and still more preferably 20 nm or less. By adjusting the primary particle diameter of the contained inorganic particles to 100 nm or less, the inorganic particles are prevented from coarsening due to aggregation thereof, which is capable of preventing membrane breakage that is triggered from the coarsened particles upon stretching. Moreover, by setting the content of inorganic particles having a primary particle diameter of 100 nm or less within the range of 10 to 60% by weight, the melting viscosity of the resin in the microporous membrane is improved, and even if the membrane is exposed to an elevated temperature environment exceeding the melting point, it does not clog up pores, capable of maintaining ion conductivity thereof. When the content of the inorganic particles is 10% by weight or more, the melting viscosity of the resin is sufficiently increased, and cycle performance at elevated temperatures and output performance at elevated temperatures are improved. On the other hand, when the content of the inorganic particles is 60% by weight or less, the inorganic particles are uniformly dispersed, and generation of a portion where performance is locally poor or deteriorated is suppressed, consequently improving the cycle performance at elevated temperatures and output performance at elevated temperatures as well as safety in the oven test.

The kinetic coefficient of friction in MD or TD of the microporous membrane in the present embodiment is 0.25 or more, preferably 0.3 or more, and more preferably 0.35 or more. The maximum value of the kinetic coefficient of friction in MD or TD is 0.7. When the kinetic coefficient of friction in MD or TD is in the range of 0.25 to 0.7, even if a battery is exposed to an elevated temperature environment and reaches a temperature at which a separator starts to shrink, the microporous membrane adheres well with electrodes and its shrinkage is suppressed small, as a consequence, capable of maintaining performances such as cycle characteristics, rate characteristics, etc. On the other hand, if the kinetic coefficient of friction in MD or TD is larger than 0.7, it is not preferable from the viewpoint of a likelihood of occurring a problem such as winding slip, etc., in a process of stacking the microporous membrane with electrodes to form a wound body.

The kinetic coefficient of friction in MD or TD can be controlled to be higher as a content of inorganic particles is large and these are uniformly dispersed in the microporous membrane. Here, the content of the inorganic particles is preferably 10 to 60% by weight based on the weight of the microporous membrane. The kinetic coefficient of friction in MD or TD being high is preferred from the standpoint of increasing adhesion with the electrodes and consequently being capable of suppressing shrinkage when a PO microporous membrane is exposed to an elevated temperature environment to generate shrinking stress. Therefore, even if the membrane is allowed to stand in an elevated temperature environment, it does not clog up pores due to shrinkage thereof, capable of improving the cycle characteristics and output characteristics in elevated temperatures.

The PO microporous membrane of the present embodiment is formed from a resin composition containing a polyolefin resin and inorganic particles. The polyolefin resin used in the present embodiment is not particularly limited, and examples thereof include polymers (homopolymers, copolymers, multistage polymers, etc.) obtained by polymerizing monomers such as ethylene, propylene, 1-butene, 4-methyl-1-pentene, 1-hexene, 1-octene, etc. These polymers can be used singly or in combination of two or more.

Moreover, as the aforementioned polyolefin resin, examples thereof include low density polyethylene (density of 0.910 g/cm$^3$ or more and less than 0.930 g/cm$^3$), linear low density polyethylene (density of 0.910 g/cm$^3$ or more and less than 0.940 g/cm$^3$), medium density polyethylene (density of 0.930 g/cm$^3$ or more and less than 0.942 g/cm$^3$), high density polyethylene (density of 0.942 g/cm$^3$ or more), ultrahigh molecular weight polyethylene (density of 0.910 g/cm$^3$ or more and less than 0.970 g/cm$^3$), isotactic polypropylene, atactic polypropylene, polybutene, ethylene propylene rubber, etc. These can be used alone or in combination of two or more. Among these, it is preferable from the viewpoint of obtaining a uniform membrane, to use only either polyethylene alone, polypropylene alone, or a mixture of polyethylene and polypropylene. From the viewpoint of improving heat resistance, the polyolefin resin more preferably contains polyethylene as a main component and polypropylene, and still more preferably contains 50% by weight or more of polyethylene and 8% by weight ±5% by weight of polypropylene. Here, including a specific component as a main component means that the content of the specific component is 50% by weight or more.

To use at least one selected from polyethylene having a viscosity-average molecular weight of less than 1,000,000 and ultrahigh molecular weight polyethylene having a viscosity-average molecular weight of 1,000,000 or more and a density of 0.942 g/cm$^3$ or less, is preferable from the viewpoint of balancing strength and permeability and further maintaining the appropriate fuse temperature.

Additionally, in the aforementioned resin composition, as necessary, antioxidants such as phenol-based, phosphorus-based, sulfur-based antioxidants, etc.; metal soaps such as calcium stearate, zinc stearate, etc.; various publicly known additives such as ultraviolet light absorbers, light stabilizers, antistatic agents, antifogging agents, coloring pigments, etc., may be mixed.

A viscosity-average molecular weight of the aforementioned polyolefin resin (it is measured according to the measurement method in Examples to be described below. In the case of using plural types of polyolefin resins, it means a value measured for each polyolefin resin.), is preferably 50,000 or more, more preferably 100,000 or more, and the upper limit is preferably 10,000,000 or less, more preferably 3,000,000 or less or 1,000,000 or less. The viscosity-average molecular weight of 50,000 or more is preferable from the viewpoint of maintaining a high melt tension upon melt-molding to ensure favorable moldability, or from the viewpoint of imparting sufficient entanglement to increase a strength of the microporous membrane. On the other hand, the viscosity-average molecular weight of 10,000,000 or less is preferred from the viewpoint of achieving uniform melt-kneading to improve sheet moldability, particularly thickness moldability. Moreover, the viscosity-average molecular weight of 1,000,000 or less is preferable from the viewpoint of improving thickness moldability.

The aforementioned inorganic particle is not particularly limited, and examples thereof include oxide-based ceramics such as alumina, silica (silicon oxide), titania, zirconia, magnesia, zinc oxide, iron oxide, etc.; nitride-based ceramics such as silicon nitride, titanium nitride, boron nitride, etc.; ceramics such as silicon carbide, calcium carbonate, aluminum sulfate, barium sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, kieselguhr, silica sand, etc.; glass fibers, etc. These may be used alone or in combination of two or more. Among these, silica, zinc oxide, alumina, titania and magnesia are more preferable from the viewpoint of electrochemical stability, with silica and zinc oxide being furthermore preferable.

[Polyolefin Microporous Membrane Manufacture Method]

A method for manufacturing a PO microporous membrane according to the first embodiment is not particularly restricted, however, an example thereof includes a method comprising an extruding step (a) of melt-kneading and extruding a resin composition containing a polyolefin resin, inorganic particles and pore-forming material, a sheet molding step (b) of molding the extruded product obtained in the previous step (a) into sheet form, a primary stretching step (c) of stretching at least once the sheet molding obtained in the step (b) at least uniaxially, an extracting step (d) of extracting the pore-forming material from the primary stretched membrane obtained in the step (c), a secondary stretching step (e) of stretching the extracted membrane obtained in the step (d) at least uniaxially, and a heat setting step (f) of thermally setting the secondary stretched membrane obtained in the step (e) at a prescribed temperature.

By the method for manufacturing the aforementioned PO microporous membrane, in the case of using it as a separator for lithium ion secondary batteries and other electrochemical devices, a PO microporous membrane exhibiting excellent performance in an elevated temperature environment and capable of imparting high heat-resistant safety, can be provided. Among the above steps, by employing the methods for stretching only in the transverse direction in the primary stretching step (c) and then stretching only in the longitudinal direction in the secondary stretching step (e) following the extracting step (d), there is a likelihood of further facilitating to achieve combination of permeability and heat-resistant safety attributed to the aforementioned performance. Additionally, the method for manufacturing the PO microporous membrane of the present embodiment is not limited to the aforementioned manufacturing method, and can variously be modified in the range which does not deviate from the gist thereof.

The method for manufacturing a PO microporous membrane according to the second embodiment is not particularly restricted, however, an example thereof includes a method comprising an extruding step (a) of melt-kneading and extruding a resin composition containing a polyolefin resin, inorganic particles and pore-forming material, a sheet molding step (b) of molding the extruded product obtained in the previous step (a) into sheet form, a primary stretching step (c) of stretching at least once the sheet molding obtained in the step (b) at least uniaxially, an extracting step (d) of extracting the pore-forming material from the primary stretched membrane obtained in the step (c), and a heat setting step (f) of thermally setting the extracted membrane obtained in the step (d) at a prescribed temperature.

[Extruding Step (a)]

The extruding step (a) is a step of melt-kneading and extruding a resin composition comprising a polyolefin resin, inorganic particles and pore-forming material. Additionally, in the extruding step (a), other component may be mixed with the resin composition as needed.

(Optional Additives)

In step (a), arbitrary additives may be comprised in the resin composition containing PO. The additive is not particularly restricted, however, for example, polymers other than the polyolefin resin; antioxidants such as a phenol-based compound, phosphine-based compound, sulfur-based compound, etc.; metal soaps such as calcium stearate, zinc stearate, etc.; ultraviolet light absorbers; light stabilizers; antistatic agents; antifogging agents; coloring pigments, etc., are included. The total amount of these additives is preferably 20 parts by weight or less, more preferably 10 parts by weight or less, and still more preferably 5 parts by weight or less with respect to 100 parts by weight of the polyolefin resin.

The method for kneading in step (a) is not particularly limited, however, an example thereof includes a method for preliminarily mixing some or all of the raw materials using a Henschel mixer, ribbon blender, tumbler blender, etc., as necessary followed by melt-kneading all the raw materials using screw extruders such as a single-screw extruder, twin-screw extruder, etc.; a kneader; a mixer, etc.

Among these, it is preferable to carry out melt-kneading using a screw of the twin-screw extruder. The Q/N ratio (Q: extrusion amount [kg/hr], N: number of screw rotation [rpm]) is preferably 0.3 or more, and more preferably 0.5 or more. As an upper limit, it is preferably 1.5 or less, and more preferably, 1.2 or less. When the Q/N ratio is 0.3 or more, the polymer can be uniformly dissolved in the plasticizer without scission of polymer chains, so that there is a likelihood of being capable of obtaining a microporous membrane with higher strength, and if the ratio is 1.5 or less, it is possible to impart a shearing force sufficient to unravel entangled polymer chains and to highly disperse the inorganic particles.

Moreover, when carrying out melt-kneading, addition of the plasticizer is preferably carried out in two or more times, and furthermore, in the case of adding the additive in multiple times, it is preferable to adjust the amount of the first addition to 80% by weight or less relative to the total addition amount from the viewpoint of uniformly dispersing inorganic particles while suppressing aggregation thereof. By uniformly dispersing the inorganic particles, the viscosity in the vicinity of the melting point of the PO microporous membrane is improved, and the pores are less likely to clog up, which improves cycle characteristics and output characteristics at elevated temperatures. Furthermore, by uniformly dispersing the inorganic particles, even when the PO microporous membrane is exposed to 150° C., it has little variation in membrane properties and is quickly ruptured, which is preferred from the viewpoint of facilitating to cause short circuit in a large area and being capable of improving safety of the cell.

When using the pore-forming material in the step (a), a temperature of the melt-kneading portion is preferably lower than 200° C. from the viewpoint of dispersibility of the inorganic particles. The lower limit of the temperature of the melt-kneading portion is equal to or higher than the melting point of the polyolefin from the viewpoint of uniformly dissolving the polyolefin resin in the plasticizer.

Upon melt-kneading in the present embodiment, a kneading method is not particularly restricted, however, it is preferred to mix an antioxidant with the raw material PO at a prescribed concentration followed by substituting the periphery of the mixture with a nitrogen atmosphere and melt-kneading the mixture in a state of holding the nitrogen atmosphere. The temperature upon melt-kneading is preferably 160° C. or higher, and more preferably 180° C. or higher. Moreover, the temperature is also preferably less than 300° C.

In the step (a), the kneaded product obtained through the aforementioned kneading is extruded by an extruder such as a T-die or annular die, etc. In this case, single layer extrusion or multiple layer extrusion may be applied. Various conditions upon extrusion are not specifically restricted, and publicly known methods are employable.

[Sheet Molding Step (b)]

The sheet molding step (b) is a step of molding the extrudate obtained in the extruding step (a) into sheet form. The sheet molding obtained by the sheet molding step (b) may be a single layer or a laminate. A method of sheet molding is not particularly restricted, however, an example thereof includes a method of solidifying the extrudate by compression cooling.

The method of compression cooling is not particularly limited, and examples thereof include a method for bringing an extrudate into direct contact with a cooling medium such as cold air, cooling water, etc.; a method for bringing the extrudate into contact with a metal roll and press machine cooled with a refrigerant, etc. Among these, the method for bringing the extrudate into contact with a metal roll and press machine cooled with a refrigerant, etc., is preferable in terms of facilitating control of a membrane thickness.

After the melt-kneading in the step (a), the set temperature in the step of molding the molten product into sheet form is preferably set higher than the set temperature of the extruder. The upper limit of the set temperature is preferably 300° C. or lower and more preferably 260° C. or lower from the viewpoint of thermal degradation of the polyolefin resin. For example, when continuously manufacturing a sheet molding from an extruder, and setting temperatures in the step of melt-kneading followed by molding into sheet form, i.e., set temperatures of the path from the extruder outlet to the T die and of the T die, to be higher than the set temperature in the extruding step, it becomes possible and preferred to mold the molten product into sheet form without reaggregation of the inorganic particles that have finely been dispersed in the melt-kneading step. In particular, when inorganic particles, etc., having a small particle size are used, aggregation of the particles is effectively suppressed.

[Primary Stretching Step (c)]

The primary stretching step (c) is a step of stretching at least once the sheet molding obtained in the sheet molding step (b) at least uniaxially. This stretching step (stretching step carried out prior to the subsequent extracting step (d)) will be referred to as "primary stretching", and the membrane obtained by the primary stretching will be referred to as "primary stretched membrane". In the primary stretching, the sheet molding can be stretched in at least one direction, and the stretching may be carried out in both MD and TD, or in only either MD or TD.

The stretching method of the primary stretching is not particularly limited, however, examples thereof include uniaxial stretching with a roll stretching machine; TD uniaxial stretching with a tenter; sequential biaxial stretching with a roll stretching machine and a tenter, or combination of a plurality of tenters; simultaneous biaxial stretching by simultaneous biaxial tenters or inflation molding, etc.

The stretching ratio of the primary stretching in MD and/or TD is preferably 2 times or more and more preferably 3 times or more. When the stretching ratio of the primary stretching in MD and/or TD is 2 times or more, the strength of the obtained PO microporous membrane tends to be further improved. Moreover, the stretching ratio of the primary stretching in MD and/or TD is preferably 10 times or less and more preferably 8 times or less or 5 times or less. When the stretching ratio of the primary stretching in MD and/or TD is 10 times or less, breakage upon stretching is likely to be further suppressed. When carrying out biaxial stretching, sequential stretching or simultaneous biaxial stretching may be employed, but the stretching ratio in each axial direction is preferably 2 times or more and 10 times or less, more preferably 3 times or more and 8 times or less, or 3 times or more and 5 times or less, respectively.

The temperature in the primary stretching is not particularly limited, and can be selected with reference to the constitution of the raw material resin contained in the PO composition, and the concentration thereof. The stretching temperature is preferably in a range (Tm−30° C. to Tm° C.) from a temperature of 30° C. below the melting point Tm of the PO microporous membrane to the melting point Tm, from the viewpoint of preventing breakage due to excessive stretching stress and balancing strength and heat shrinkage. When the main component of the PO microporous membrane is polyethylene, the stretching temperature is preferably 110° C. or higher, and preferably 130° C. or lower from the viewpoint of enhancing the strength of the microporous membrane. Specifically, the stretching temperature is preferably 100 to 135° C., more preferably 110 to 130° C., and further preferably 115 to 129° C.

[Extracting Step (d)]

The extracting step (d) is a step of extracting the pore-forming material from the primary stretched membrane obtained in the primary stretching step (c) to obtain an extracted membrane. Examples of the method for removing the pore-forming material include a method such as immersing the primary stretched membrane in an extraction solvent to extract the pore-forming material and sufficiently drying the membrane, etc. The method for extracting the pore-forming material may be either a batch type or a continuous type. Moreover, the residual amount of the pore-forming material, particularly the plasticizer in the porous membrane is preferably less than 1% by weight. Further, the amount of the inorganic particles extracted by this step is preferably 1% by weight or less and more preferably substantially 0% by weight, based on the blending amount in the microporous membrane.

As an extraction solvent used when extracting the pore-forming material, it is preferable to use a solvent which is a poor solvent for the polyolefin resin and a good solvent for the pore-forming material, plasticizer and has a boiling point lower than the melting point of the polyolefin resin. Such extraction solvents are not particularly restricted, however, examples thereof include hydrocarbons such as n-hexane, cyclohexane, etc.; halogenated hydrocarbons such as methylene chloride, 1,1,1-trichloroethane, etc.; non-chlorine-based halogenated solvents such as hydrofluoroether, hydrofluorocarbon, etc.; alcohols such as ethanol, isopropanol, etc.; ethers such as diethyl ether, tetrahydrofuran, etc.; and ketones such as acetone, methyl ethyl ketone, etc. Additionally, these extraction solvents may be recovered by distillation, etc., and reutilized.

[Secondary Stretching Step (e)]

The secondary stretching step (e) is a step of stretching the extracted membrane obtained in the extracting step (d) in at least a uniaxial direction. This stretching step (stretching step carried out after the extracting step (d)) will be referred to as "secondary stretching", and the membrane obtained by the secondary stretching will be referred to as "secondary stretched membrane". In the secondary stretching, the porous membrane obtained through the extracting step (d) can be stretched in at least one direction, and the stretching may be carried out in both MD and TD, or in only either MD or TD.

The stretching ratio of the secondary stretching in MD is preferably 1.1 times or more, more preferably 2.0 times or more, and further preferably 3.0 times or more. Moreover, the stretching ratio of the secondary stretching in TD is preferably 1.1 times or more, more preferably 1.5 times or more, and still mote preferably 2.0 times or more. In the case of stretching in biaxial directions, the stretching ratio is preferably 1.1 times or more and more preferably 2.0 times or more in at least one direction of MD and TD.

Moreover, the stretching step of the present embodiment may include primary stretching only or both primary stretching and secondary stretching, but the final total stretching ratio in each axial direction is preferably 2 times or more, more preferably 3 times or more, and still more preferably 5 times or more, respectively. Moreover, the final total stretching ratio by area is preferably 9 times or more, more preferably 16 times or more, and still more preferably 25 times or more. When the total stretching ratio and the total stretching ratio by area are within the above ranges, the strength and permeability of the resulting PO microporous membrane tend to be further improved. Further, from the viewpoint of dimensional stability and prevention of breakage upon stretching, the total stretching ratio in each axial direction is preferably less than 20 times, and the total ratio by area is preferably 200 times or less.

The stretching step of the present embodiment may include primary stretching and secondary stretching. The ratio of the maximum strain rate (primary stretching maximum strain rate/secondary stretching maximum strain rate) in each stretching step is preferably 0.4 or less, more preferably 0.3 or less, and still more preferably 0.2 or less. The ratio of the maximum strain rate being in the above range, although not known why, is preferred from the viewpoint of preventing an increase in the alternating current electrical resistance in the vicinity of the melting point of the PO microporous membrane to improve battery performance. The strain rate is obtained as follows.

Strain rate (%/second)=(Stretching ratio−1)×100÷Stretching time (second)

Stretching time (second)=Stretching distance (m)÷Stretching rate (m/second)

In each stretching step, when stretching in multiple stages, the value of strain rate may not be constant. In this case, the strain rate at a stage where the strain rate is maximized is set as the maximum strain rate in the stretching step. For example, when stretching is carried out using a roll stretching machine having a plurality of stages, the maximum strain rate is calculated using the inter-roll distance and inter-roll speed at which the strain rate becomes maximum, as the stretching distance and stretching rate, respectively.

The temperature of the secondary stretching is not particularly limited, and can be selected with reference to the constitution of the raw material resin and the concentration thereof contained in the PO composition. The stretching temperature is preferably in a range (Tm−30° C. to Tm° C.) from a temperature of 30° C. below the melting point Tm of the PO microporous membrane to the melting point Tm, from the viewpoint of preventing breakage due to excessive stretching stress and balancing strength and heat shrinkage. When the main component of the PO microporous membrane is polyethylene, the stretching temperature is preferably 110° C. or higher, and preferably 130° C. or lower from the viewpoint of enhancing the strength of the microporous membrane. The stretching temperature is more preferably 115 to 129° C. and still more preferably 118 to 127° C.

Further, the porosity of the secondary stretched membrane is preferably 55% or more, and more preferably 60% or more. The porosity of the secondary stretched membrane of 55% or more is preferred from the viewpoint of being capable of setting a high heat setting temperature and suppressing heat shrinkage in the next step (f). As a result, cycle characteristics and output characteristics in the elevated temperature environment can be improved. Moreover, the porosity of the secondary stretched membrane is preferably 90% or less from the viewpoint of strength.

[Heat Setting Step (f)]

The heat setting step (f) is a step of heat-setting the secondary stretched membrane obtained in the secondary stretching step (e) or the extracted membrane obtained in the extracting step (d) at a prescribed temperature. The heat treatment method in this case is not particularly limited, and an example thereof includes a heat setting method in which stretching, and relaxation operations are carried out using a tenter or a roll stretching machine.

The stretching operation in the heat setting step (f) is an operation of stretching the PO microporous membrane in at least one direction of MD and TD, and the stretching may be carried out in both MD and TD, or in only either MD or TD.

The stretching ratio in MD and TD in the heat setting step (f) is preferably 1.4 times or more, and more preferably 1.5 times or more, respectively. Further, the upper limit of the stretching ratio in MD and TD in the heat setting process (0 is not specifically limited, however, preferably 5 times or less. When the stretching ratio is out of the above range, shrinkage stress in the vicinity of the melting point remains, which tends to deteriorate heat shrinkage. Moreover, the stretching ratio in the aforementioned range has a likelihood of further improving strength and porosity of a porous membrane.

The stretching temperature in this stretching operation is not particularly limited, however, is preferably a temperature of 20° C. below the melting point Tm of the PO microporous membrane or higher (i.e., the stretching temperature Tm−20° C.), and more preferably a temperature of the melting point Tm of the PO microporous membrane minus 15° C. or higher, and still more preferably in a range (Tm−10° C. to Tm) from a temperature of the melting point Tm of the PO microporous membrane minus 10° C. or higher to the melting point Tm. The stretching temperatures in the aforementioned ranges have a likelihood of further reducing heat shrinkage of the obtained PO microporous membrane and increasing porosity and strength thereof.

The relaxation operation in the heat setting step (f) is an operation of shrinking the PO microporous membrane in at least one direction of MD and TD, and may be carried out in both MD and TD or in only MD or TD. The relaxation ratio in the heat setting step (f) is preferably 5% or more, more preferably 7% or more, and further preferably 10% or more. When the relaxation ratio in the heat setting step (f) is 5% or more, the heat resistance in the oven test tends to be further improved. Moreover, the relaxation ratio is preferably 30% or less from the viewpoint of membrane quality, and more preferably 25% or less from the viewpoint of increasing the relaxation temperature. Here, the "relaxation ratio" is a value obtained by dividing a value obtained by subtracting the dimension of the membrane after the relaxation operation from the dimension of the membrane before the relaxation operation, by the dimension of the membrane before the relaxation operation. When the relaxation is carried out in both MD and TD, the relaxation ratio means a value obtained by multiplying the MD relaxation ratio and the TD relaxation ratio.

Relaxation ratio (%)=(Dimension of membrane before relaxation operation (m)−Dimension of membrane after relaxation operation (m))/(Dimension of membrane before relaxation operation (m))×100

The relaxation temperature in this relaxation operation is not particularly limited, but in order to obtain the separator according to the first embodiment, it is preferably a temperature of 10° C. above the melting point Tm of the PO microporous membrane or lower, more preferably in a range (Tm−5° C. to Tm+15° C.) from a temperature of the melting point Tm minus 5° C. to a temperature of the melting point Tm plus 15° C., still more preferably in a range (Tm−3° C. to Tm+10° C.) from a temperature of the melting point Tm minus 3° C. to a temperature of the melting point Tm plus 10° C., and particular preferably in a range (Tm−1° C. to Tm+8° C.) from a temperature of the melting point Tm minus 1° C. to a temperature of the melting point Tm plus 8° C.

In order to obtain the separator according to the second embodiment, the relaxation temperature is preferably a temperature of 5° C. above the melting point Tm of the PO microporous membrane or lower, more preferably in a range (Tm−10° C. to Tm) from a temperature of the melting point Tm of the PO microporous membrane minus 10° C. to the temperature of the melting point Tm, and still more preferably in a range (Tm−8° C. to Tm−2° C.) from the temperature of the melting point Tm minus 8° C. to the temperature of the melting point Tm minus 2° C.

When the temperature in the relaxation operation is in the above range, not only can the residual stress generated in the stretching step be removed, but also the orientation of the molecular chains can be firmly fixed, which is preferable form the view point of preventing an increase in an alternating current resistance in the vicinity of the melting point of the PO microporous membrane to improve battery performance.

[Other Steps]

The method for manufacturing the PO microporous membrane of the present embodiment may comprise steps other than the above steps (a) to (f). Other steps are not particularly limited, however, an example thereof includes, in addition to the heat setting step described above, a laminating step of stacking a plurality of single layer PO microporous membranes as a step for obtaining a laminate of PO microporous membranes. Moreover, the method for manufacturing the PO microporous membrane of the present embodiment may comprise a surface treatment step of subjecting a surface of the PO microporous membrane to treatments such as electron beam irradiation, plasma irradiation, surfactant coating, chemical modification, etc. Further, one or both sides of the PO microporous membrane are coated with the aforementioned inorganic material to obtain a PO microporous membrane having an inorganic material layer.

<Formation of Inorganic Coating Layer>

From the viewpoint of safety, dimensional stability, heat resistance, etc., an inorganic coating layer can be disposed on a surface of the polyolefin microporous membrane. The inorganic coating layer is a layer containing inorganic components such as inorganic particles, etc., and may contain a binder resin that adheres the inorganic particles with each other, a dispersant that disperses the inorganic particles in the binder resin, etc., if desired.

As the inorganic particle, examples thereof include oxide-based ceramics such as alumina, silica, titania, zirconia, magnesia, ceria, yttria, zinc oxide, iron oxide, etc.; nitride-based ceramics such as silicon nitride, titanium nitride, boron nitride, etc.; ceramics such as silicon carbide, calcium carbonate, magnesium sulfate, aluminum sulfate, barium sulfate, aluminum hydroxide, aluminum hydroxide oxide, potassium titanate, talc, kaolinite, dickite, nakhlite, halloysite, pyrophyllite, montmorillonite, sericite, mica, Amesite, bentonite, asbestos, zeolite, calcium silicate, magnesium silicate, kieselguhr, silica sand, etc.; glass fibers, etc. The inorganic particles may be used alone or in combination thereof.

Examples of the binder resin include conjugated diene-based polymers, acrylic-based polymers, polyvinyl alcohol-based resins, fluorine-containing resins, etc. The binder resin can also be in the form of a latex and contain water or an aqueous solvent.

The dispersant is adsorbed on the surface of the inorganic particles in a slurry and stabilizes the inorganic particles by electrostatic repulsion, etc., and for example, polycarboxylate, sulfonate, polyoxyether, surfactants, etc., are included.

The inorganic coating layer can be formed, for example, by coating a surface of the polyolefin microporous membrane with a slurry of the components explained above followed by drying.

<Formation of Adhesive Layer>

In order to prevent deformation or swelling due to gas generation of a laminate-type battery which has been increasingly applied also in vehicle onboard batteries to increase energy density in recent years, an adhesive layer containing a thermoplastic resin can be disposed on a surface of the polyolefin microporous membrane. The thermoplastic resin contained in the adhesive layer is not particularly limited, and examples thereof include polyolefins such as polyethylene, polypropylene, etc.; fluorine-containing resins such as polyvinylidene difluoride, polytetrafluoroethylene, etc.; fluorine-containing rubbers such as a vinylidene fluoride-hexafluoropropylene copolymer, vinylidene fluoride-tetrafluoroethylene copolymer, vinylidene fluoride-hexafluoropropylene tetrafluoroethylene copolymer, ethylene-tetrafluoroethylene copolymer, etc.; rubbers such as a styrene-butadiene copolymer and hydride thereof, acrylonitrile-butadiene copolymer and hydride thereof, acrylonitrile-butadiene-styrene copolymer and hydride thereof, (meth)acrylic acid ester copolymer, styrene-acrylic acid ester copolymer, acrylonitrile-acrylic acid ester copolymer, ethylene propylene rubber, polyvinyl alcohol, polyvinyl acetate, etc.; cellulose derivatives such as ethyl cellulose, methyl cellulose, hydroxyethyl cellulose, carboxymethyl cellulose, etc.; resins having a melting point and/or glass transition temperature of 180° C. or higher, such as polyphenylene ether, polysulfone, polyether sulfone, polyphenylene sulfide, polyetherimide, polyamideimide, polyamide, polyester, etc.

Furthermore, after the post-processing step described above, a master roll wound with the microporous membrane can be subjected to an aging treatment under a prescribed temperature condition and then a rewinding operation can also be carried out to the master roll. This operation has a tendency to facilitate to obtain a PO microporous membrane having higher thermal stability. In the above case, the temperature upon the aging treatment of the master roll is not particularly limited, however, is preferably 35° C. or higher, more preferably 45° C. or higher, and further preferably 60° C. or higher. Moreover, from the viewpoint of maintaining permeability of the PO microporous membrane, the temperature upon the aging treatment of the master roll is preferably 120° C. or lower. The time required for the aging treatment is not particularly limited, however, is preferably 24 hours or longer, facilitating production of the effects above described.

The membrane thickness of the polyolefin microporous membrane in the present embodiment is preferably 2 nm or more, more preferably 5 nm or more, and the upper limit of the membrane thickness is preferably less than 100 μm, more preferably less than 40 μm, still more preferably less than 20 μm, and most preferably less than 15 μm. Setting the membrane thickness to 2 μm or more is preferable from the viewpoint of improving the mechanical strength and the voltage resistance. On the other hand, when the membrane thickness is less than 100 μm, it is preferable from the viewpoint of securing favorable output characteristics, and when it is less than 15 μm, the occupied volume of the polyolefin microporous membrane is reduced, which tends to be advantageous in terms of increasing a capacity of the battery. It is noted the membrane thickness of the polyolefin microporous membrane is measured according to the measurement method in the Example to be described below.

Additionally, the membrane thickness can be adjusted by adjusting the sheet thickness in the step (b), the stretching ratio in the step (c), the stretching temperature, etc., and combining these.

The porosity of the polyolefin microporous membrane in the present embodiment is preferably 45% or more, more preferably 50% or more, and the upper limit of the porosity is preferably less than 80%, more preferably 75% or less. Setting the porosity to 45% or more is preferable from the viewpoint of securing favorably output characteristics. On the other hand, setting the porosity to less than 80% is preferred from the viewpoint of securing the puncture strength and the viewpoint of securing the voltage resistance. It is noted the porosity of the polyolefin microporous membrane is measured according to the measurement method in the Example to be described below.

Additionally, the porosity described above is adjusted by adjusting the proportion of the polyolefin resin/inorganic particles/plasticizer in the step (a), the stretching temperature and the stretching ratio, etc., in the step (c), by controlling the heat setting temperature, the stretching ratio upon heat setting, and the relaxation ratio upon heat setting in the step (0, and by combining these.

The air permeability of the polyolefin microporous membrane in the present embodiment is preferably 2 seconds/100 cc/μm or more, more preferably 3 seconds/100 cc/μm or more, and the upper limit of the air permeability is preferably 10 seconds/100 cc/μm or less, more preferably 6 seconds/100 cc/μm or less, and even more preferably 5 seconds/100 cc/μm or less. The air permeability of 2 seconds/100 cc/μm or more is preferable from the viewpoint of suppressing self-discharge of a battery. On the other hand, setting the air permeability to 10 seconds/100 cc/μm or less is preferred from the viewpoint of obtaining favorable charge/discharge characteristics. It is noted the air permeability of the polyolefin microporous membrane is measured according to the measurement method in the Example to be described below.

In addition, the aforementioned air permeability is adjusted by adjusting the proportion of the polyolefin resin/inorganic particles/plasticizer in the step (a), the stretching temperature and the stretching ratio in the step (c), by controlling the heat setting temperature, the stretching ratio upon heat setting, and the relaxation ratio upon heat setting in the aforementioned step (f), and by combining these.

<Electrochemical Device>

An electrochemical device which houses a wound body consisted by winding the microporous membrane according to the present embodiment, or a laminate consisted by stacking a plurality of the microporous membranes, is also an aspect of the present invention. The electrochemical device includes a nonaqueous electrolytic solution battery, nonaqueous electrolyte battery, nonaqueous lithium ion secondary battery, nonaqueous gel secondary battery, nonaqueous solid secondary battery, lithium ion capacitor, electric double layer capacitor, etc.

The nonaqueous electrolyte battery according to the present embodiment is provided with a separator for nonaqueous electrolytic solution batteries comprising the polyolefin microporous membrane described above, positive electrode plate, negative electrode plate, nonaqueous electrolytic solution (a nonaqueous solvent and a metal salt dissolved therein are included.). Specifically, for example, a positive electrode plate containing transition metal oxide capable of intercalating and releasing lithium ions, etc., and a negative electrode plate capable of intercalating and releasing lithium ions, etc., are wound or laminated via a separator interposed therebetween and housed in a container with the nonaqueous electrolytic solution being held therein.

A positive electrode plate will be described below. As the positive electrode active material, for example, lithium composite metal oxides such as lithium nickelate, lithium manganate or lithium cobaltate, etc., and lithium composite metal phosphates such as lithium iron phosphate, etc., can be used. The positive electrode active material is kneaded with a conductive agent and a binder to obtain a positive electrode paste, a surface of a positive electrode current collector such as an aluminum foil is coated and dried with the paste, and the coated collector is rolled to a prescribed thickness and then cut into a prescribed dimension to obtain a positive electrode plate. Here, as the conductive agent, a metal powder that is stable under a positive electrode potential, for example, carbon black such as acetylene black, etc., or a graphite material can be used. Moreover, as the binder, a material that is stable under the positive electrode potential, for example, such as polyvinylidene difluoride, modified acrylic rubber or polytetrafluoroethylene, etc., can be used.

A negative electrode plate will be described below. As the negative electrode active material, a material capable of intercalating lithium can be used. Specifically, for example, at least one selected from the group consisting of graphite, silicide, titanium alloy material, etc., can be used. Moreover, as a negative electrode active material of a nonaqueous electrolyte secondary battery, a metal, metal fiber, carbon material, oxide, nitride, silicon compound, tin compound, or various alloy materials, etc., can be used. In particular, silicon compounds or tin compounds such as silicon (Si) or tin (Sn), alloys, compounds, or solid solution thereof, etc., are preferable because the capacity density of the battery tends to increase.

Examples of the carbon material include various natural graphites, coke, graphitizing carbon, carbon fiber, spherical carbon, various artificial graphites, amorphous carbon, etc.

As the negative electrode active material, one of the aforementioned materials may be used singly, or two or more may be used in combination. The negative electrode active material is kneaded with a binder to obtain a negative electrode paste, a surface of a negative electrode current collector such as a copper foil is coated and dried with the negative electrode paste, and the coated collector is rolled to a prescribed thickness and then cut to a prescribed dimension to form a negative electrode plate. Here, as the binder, a material that is stable under a negative electrode potential, such as PVDF or a styrene-butadiene rubber copolymer, etc., can be used.

The nonaqueous electrolytic solution will be described below. The nonaqueous electrolytic solution generally contains a nonaqueous solvent and a metal salt such as a lithium salt, sodium salt, calcium salt, etc., dissolved therein. As the nonaqueous solvent, cyclic carbonate, linear carbonate, or cyclic carboxylic acid ester, etc., are used. Examples of the lithium salt include $LiPF_6$, $LiClO_4$, $LiBF_4$, $LiAlCl_4$, $LiSbF_6$, $LiSCN$, $LiCF_3SO_3$, $LiCF_3CO_2$, $Li(CF_3SO_2)_2$, $LiAsF_6$, lower aliphatic lithium carboxylate, LiCl, LiBr, LiI, borate salts, imide salts, etc.

It is noted, as the measurement method of the various parameters described above, it is measured according to the measurement methods in the Example to be described below unless otherwise specified.

EXAMPLE

The present embodiment will be described below in more detail by way of Examples and Comparative Examples, and the present invention is not limited to the Examples unless the present invention depart from the scope of the gist thereof. It is noted that the physical properties in Examples are measured by the methods as described below. The measurements were carried out in an environment of room temperature of 23° C. and humidity of 40% unless otherwise specified.

(1) Viscosity-Average Molecular Weight (Mv)

The intrinsic viscosity [η] at 135° C. in a decalin solvent based on ASTM-D4020 was measured. For polyethylene, the viscosity-average molecular weight was calculated using the following equation.

$$[\eta]=6.77\times10^{-4}\,Mv^{0.67}$$

For polypropylene, the viscosity-average molecular weight was calculated using the following equation.

$$[\eta]=1.10\times10^{-4}\,Mv^{0.80}$$

(2) Average Primary Particle Diameter

The average primary particle diameter of the inorganic particles was measured with a scanning electron microscope. Specifically, a 10 μm×10 μm visual field image magnified by a scanning electron microscope (SEM) is directly or after being printed on a photograph from a negative read into an image analysis device. Then, the number-average value of the circle converted diameter (diameter of the circle having the same area of the particle) of each particle, that was calculated from the image analysis result, was defined as the average primary particle diameter of the inorganic particles. It is noted that if the staining boundary is unclear when inputting from the photograph to the image analysis apparatus, the base photograph was traced and input to the image analysis apparatus using this figure.

(3) Membrane Thickness (μm)

The membrane thickness of a sample was measured at a room temperature of 23° C. using a micro thickness gauge, KBM (trademark), manufactured by Toyo Seiki Co., Ltd.

(4) Porosity (%)

A 10 cm×10 cm square sample was cut out from the polyolefin microporous membrane, the volume (cm$^3$) and weight (g) of the sample were measured, and the porosity was calculated from these and the membrane density (g/cm$^3$) using the following equation:

Porosity (%)=(Volume−Weight/Membrane density)/Volume×100

It is noted the density of a mixed composition was used as the value calculated from density of the polyolefin resin and the inorganic particles each, and the mixing ratio thereof.

(5) Air Permeability (sec)

Air permeability of a sample was measured using a Gurley type air permeability tester G-B2 (trademark) manufactured by Toyo Seiki Co., Ltd., according to JIS P-8117.

(6) Puncture Strength (N)

The polyolefin microporous membrane was set with a sample holder having an opening diameter of 11.3 mm, using a handy compression tester KES-G5 (trademark) manufactured by Kato Tech Co., Ltd. Subsequently, a puncture test was carried out by contacting the center of the set microporous membrane and a needle with tip diameter of 1 mm and curvature radius of 0.5 mm under conditions with a puncture speed of 2 mm/second and an atmospheric temperature of 25° C., and the puncture strength (N) was obtained as the maximum puncture load.

(7) Tensile Strength

In accordance with JIS K7127, MD and TD samples (shape: width 10 mm×length 100 mm) were measured using a tensile tester Autograph AG-A (trademark) manufactured by Shimadzu Corporation. Moreover, the distance of the sample between the chucks was 50 mm, and the sample in which cellophane (registered trademark) (N. 29 cellophane (registered trademark) tape manufactured by Nitto Denko CS System Co., Ltd.) tapes (product name: N. 29 manufactured by Nitto Denko Packaging System Co., Ltd.) were attached to each side of the both edge portions (25 mm each) thereof, was used. Further, in order to prevent sample slipping during the test, 1 mm thick fluororubber was affixed inside the chuck of the tensile tester. The tensile strength (kg/cm$^2$) was determined by dividing the strength at break by the cross-sectional area of the sample before the test. It is noted the measurement was carried out under conditions of a temperature of 23±2° C., chuck pressure of 0.30 MPa, and stretching speed of 200 mm/minute.

(8) Kinetic Coefficient of Friction

The kinetic coefficient of friction of the sample having a size of the width of 50 mm and 200 mm in measurement direction, was measured three times in MD and TD, and the values obtained were averaged, respectively, using a KES-SE friction tester manufactured by Kato Tech Co., Ltd. under conditions: sample load of 50 g, contactor area of 10×10=100 mm$^2$ (a stainless steel wire (0.5 mmφ hard stainless steel wire, SUS304 piano wire was wound around the contactor twenty times without gap and overlapping with each other.), contactor feed speed of 1 mm/second, tension of 6 kPa, temperature of 23° C., and humidity of 50%. The value of the kinetic coefficient of friction was used as a value for the surface that contacts a negative electrode when fabricating a battery.

(9) DSC Measurement (Differential Scanning Calorimetric)

DSC was measured using a DSC60 manufactured by Shimadzu Corporation. First, the PO microporous membrane was punched into a circle with a diameter of 5 mm, and the several circle membranes obtained were stacked to weigh 3 mg as a measurement sample. This sample was laid on an aluminum open sample pan having a diameter of 5 mm, a clamping cover was placed thereon, and the sample was fixed in the aluminum pan by a sample sealer. In a nitrogen atmosphere, the temperature was raised from 30° C. to 200° C. at a rising rate of 10° C./minute (first temperature rise), held at 200° C. for 5 minutes, and then dropped from 200° C. to 30° C. at a rate of 10° C./minute. Subsequently, after holding for 5 minutes at 30° C., the temperature was raised again from 30° C. to 200° C. at a rate of 10° C./minute (2nd temperature rise). In the melting endothermic curve of the second temperature rise, the maximum temperature was defined as the melting point of the PO microporous membrane. When there observed a plurality of maximum values, the temperature at which the largest maximum value in the melting endothermic curve was adopted as the melting point of the PO microporous membrane.

(10) Thermal Behavior Evaluation (TMA: Thermomechanical Analysis)

[Behavior Evaluation (1)]

Thermal behavior of a sample was measured using a TMA 50 (trademark) manufactured by Shimadzu Corporation. The sample was fix to chucks at both ends and set in a specific prove such that the distance (in MD) of the sample between the chucks was 10 mm, wherein the sample was cut out into about 15 mm in MD and about 3 mm in TD. An initial load was 0.0098N (1.0 gf), and a temperature of the prove was raised from 30° C. to 150° C. at a rate of 10° C./minute in a constant length mode, and subsequently held at 150° C. for 10 minutes. The time after reaching 150° C. until a shrinkage stress of the microporous membrane falls less than 0.0098N (1.0 gf) was regarded as a retention time. A moment when the shrinkage stress was less than 0.0098N (1.0 gf) was regarded as breakage, and the retention time was used as an index for the thermal behavior evaluation (1).

[Behavior Evaluation (2)]

Thermal behavior was measured using a TMA 50 (trademark) manufactured by Shimadzu Corporation. The sample was fixed to chucks at both ends and set in a specific prove such that the distance in MD of the sample between the chucks was 10 mm, wherein the sample was cut out into about 15 mm in MD and about 3 mm in TD. An initial load was 0.0098N (1.0 gf), a temperature of the prove was raised from 30° C. to 145° C. at a rate of 10° C./minute in a constant length mode, and subsequently held at 145° C. for 10 minutes. The time after reaching 145° C. until a shrinkage stress of the microporous membrane falls less than 0.0098N (1.0 gf) was regarded as a retention time. A moment when the shrinkage stress was less than 0.0098N (1.0 gf) was regarded as breakage, and the retention time was used as an index for the thermal behavior evaluation (2).

(11) Evaluation of Alternating Current Electrical Resistance

FIG. 1 (A) shows a schematic diagram illustrating an alternating current electrical resistance measurement apparatus. 1 denotes a microporous membrane, 2A and 2B denote nickel foils with a thickness of 10 µm, and 3A and 3B denote glass plates. An electrical resistance measurement device 4 (LCR meter "AG-4311" (trademark) manufactured by Ando Electric Co., Ltd.) is connected to the nickel foils 2A and 2B. A thermocouple 5 is connected to a thermometer 6. A data collector 7 is connected to the electrical resistance measurement device 4 and the thermometer 6. An oven 8 heats the microporous membrane.

More specifically, as shown in FIG. 1 (B), the microporous membrane 1 is overlaid on the nickel foil 2A, and longitudinally fixed with "Teflon" (registered trademark) tape (hatched portion in the figure). The microporous membrane 1 has been impregnated with a 1 mol/liter lithium borofluoride solution (solvent: propylene carbonate/ethylene carbonate/γ-butyl lactone=1/1/2 by volume) as an electrolytic solution. As shown in FIG. 1 (C), a "Teflon" (registered trademark) tape (hatched portion in the figure) is adhered on the nickel foil 2B for masking, leaving a 15 mm×10 mm window at the center of foil 2B. FIGS. 1 (D)-(F) are cross-sectional views showing the location of an inorganic coating layer or adhesive layer 9 with respect to the microporous membrane 1.

The nickel foil 2A and nickel foil 2B are combined in such a manner as to sandwich the microporous membrane 1, and the two nickel foils are further sandwiched by the glass plates 3A and 3B from both sides of the foils. In this case, the window portion of the foil 2B and the porous membrane 1 are positioned to be opposite to each other.

The two glass plates 3A and 3B are fixed by pinching with a commercially available double clip. The thermocouple 5 is fixed to the glass plate with a "Teflon" (registered trademark) tape.

A temperature and electrical resistance were measured continuously using such an apparatus. The temperature was raised from room temperature to 35° C. in 5 minutes and held at 35° C. for 30 minutes. Subsequently, the temperature was raised at a rate of 2° C./minute from 35° C. to the melting point of the PO microporous membrane or the temperature of the melting point plus 10° C., and after reaching the prescribed temperature, it was held at the aforementioned temperature for 1 hour or longer. The alternating current electrical resistance after an elapse of 30 minutes at 35° C. was R35. The alternating current electrical resistances after an elapse of 30 minutes and 1 hour each after reaching the melting point of the PO microporous membrane were Rmelt (30 minutes) and Rmelt (1 hour), respectively, and the alternating current electrical resistance after an elapse of 1 hour after reaching the temperature of the melting point of the PO microporous membrane plus 10° C. was Rmelt+10. The value of the alternating current electrical resistance was measured with an alternating current of 1 kHz.

(12) Measurement of Heat Shrinkage in TD at 120° C.

A sample was cut into a square with each side of 100 mm in MD and TD, placed in the oven previously heated to 120° C., and taken out from the oven after 1 hour, and the dimensional shrinkage of the sample was determined. The sample was placed on a copy paper, etc., so as not to adhere to the inner wall of the oven, etc., or not to melt and adhere to each other. The heat shrinkage was calculated according to the following equation:

Heat shrinkage (%): (Dimension before heating (mm)−Dimension after heating (mm))/(Dimension before heating (mm))×100

(13) Battery Evaluation (Safety Evaluation)

a. Battery Fabrication (a-1) Fabrication of Positive Electrode Plate

A slurry was prepared by dispersing 92.2% by weight of lithium cobalt composite oxide $LiCoO_2$ as an active material, 2.3% by weight of scaly graphite and acetylene black each as conductive materials, and 3.2% by weight of polyvinylidene difluoride (PVDF) as a binder in N-methylpyrrolidone (NMP). One side surface of a 20 µm thick aluminum foil to be used as a positive electrode current collector was coated with the slurry using a die coater followed by drying at 130° C. for 3 minutes, and then the coating foil was compression-molded using a roll press machine. In this case, the coating amount of the active material of the positive electrode was adjusted to 250 g/m² and the bulk density of the active material to 3.00 g/cm³. The obtained compressed product was slit to a width of 40 mm.

(a-2) Fabrication of Negative Electrode

A slurry was prepared by dispersing 96.9% by weight of artificial graphite as an active material, 1.4% by weight of an ammonium salt of carboxymethylcellulose and 1.7% by weight of a styrene butadiene copolymer latex as binders in purified water. One side surface of a 12 µm thick copper foil to be used as a negative electrode current collector was coated with the slurry using a die coater followed by drying at 120° C. for 3 minutes, and then the coating foil was compression-molded using a roll press machine. In this case, the coating amount of the active material of the negative electrode was adjusted to 106 g/m² and the bulk density of the active material to 1.35 g/cm³. The obtained compressed product was slit to a width of 40 mm.

(a-3) Preparation of Nonaqueous Electrolytic Solution

As the nonaqueous electrolytic solution, $LiPF_6$ as a solute was dissolved to 1.0 mol/L in a mixed solvent of ethylene carbonate:ethyl methyl carbonate:dimethyl carbonate wherein the volume ratio thereof is 1:1:1, to prepare a nonaqueous electrolytic solution.

(a-4) Winding and Assembly

The separator formed of the microporous membrane, the aforementioned belt-shaped positive electrode, and the belt-shaped negative electrode were stacked in the order of the belt-shaped negative electrode, the separator, the belt-shaped positive electrode, and the separator, and wound several times in a spiral shape to fabricate an electrode plate laminate.

The electrode plate laminate was pressed into a flat plate shape, and then housed in an aluminum container. The aluminum lead led out from the positive electrode current collector was connected to the container wall, and the nickel lead led out from the negative electrode current collector to the terminal portion of the container lid. Further, the non-aqueous electrolytic solution was poured into the container and it was sealed. The prismatic lithium ion battery thus manufactured was designed to have a longitudinal length (thickness) of 6.3 mm, a transverse length of 30 mm, a height of 48 mm and a nominal discharge capacity of 620 mAh.

b. Capacity Measurement (mAh)

The lithium ion battery assembled as described above was charged with a constant current and constant voltage (CCCV) for 6 hours under the conditions of a current value of 310 mA (0.5 C) and a cut-off battery voltage of 4.2V. At this time, the current value immediately before the end of charging was almost zero. Thereafter, the battery was allowed to stand (aging) for 1 week in an atmosphere at 25° C.

Next, the battery was subjected to a charge/discharge cycle wherein it was charged with a constant current and constant voltage (CCCV) for 3 hours under the conditions of a current value of 620 mA (1.0 C) and a cut-off battery voltage of 4.2V, and then discharged down to a battery voltage of 3.0V with a constant current value (CC) of 620 mA. The discharging capacity at this time was defined as an initial discharging capacity X. A battery having the initial discharging capacity X within ±10 mAh was used for safety evaluation.

c. Cycle Test

Using the battery assembled as described above, it was charged and discharged totally 50 cycle times wherein one cycle includes (i) a current amount of 0.5 C, upper limit voltage of 4.2 V, and charging with a constant current and constant voltage for a total of 8 hours, (ii) holding for 10 minutes, (iii) a current amount of 0.5 C and constant current discharging with a cut-off voltage of 2.5V, and (iv) holding for 10 minutes. All the charge/discharge treatments were carried out in an atmosphere of 25° C. Thereafter, the ratio of the discharging capacity at the 50th cycle to the initial battery capacity X (mAh) as described above was multiplied by 100 to obtain the capacity retention ratio (%). Furthermore, the capacity retention ratio was evaluated and ranked according to the following criteria.

A: Capacity retention ratio (%) of 70% or more.
B: Capacity retention ratio (%) of 50% or more and less than 70%.
C: Capacity retention ratio (%) of 40% or more and less than 50%.
D: Capacity retention ratio (%) of 30% or more and less than 40%.
E: Capacity retention ratio (%) of less than 30%.

d. High temperature Cycle Test

Using the battery assembled as described above, it was charged and discharged 50 cycle times totally wherein one cycle includes (i) a current amount of 0.5 C, upper limit voltage of 4.2 V, and charging with a constant current and constant voltage for a total of 8 hours, (ii) holding for 10 minutes, (iii) a current amount of 0.5 C and constant current discharging with a cut-off voltage of 2.5V, and (iv) holding for 10 minutes. All the charge/discharge treatments were carried out in an atmosphere of 100° C. Thereafter, the ratio of the discharging capacity at the 50th cycle to the afore-mentioned initial battery capacity X (mAh) was multiplied by 100 to obtain the capacity retention ratio (%). It is noted the capacity retention ratio was evaluated and ranked according to the following criteria.

A: Capacity retention ratio (%) of 70% or more.
B: Capacity retention ratio (%) of 50% or more and less than 70%.
C: Capacity retention ratio (%) of 40% or more and less than 50%.
D: Capacity retention ratio (%) of 30% or more and less than 40%.
E: Capacity retention ratio (%) of less than 30%.

e. High Temperature Output Characteristics Test

The battery assembled as described above was maintained in a constant temperature atmosphere at 100° C., and a 1 C discharging capacity and 5 C discharging capacity up to a discharge cut-off voltage of 3V were measured, from which the 5 C capacity/1 C capacity was defined as the output characteristics value. Furthermore, the output characteristics value was evaluated and ranked according to the following criteria.

A: Output characteristics value of 0.85 or more.
B: Output characteristics value of 0.75 or more and less than 0.85.
C: Output characteristics value of 0.70 or more and less than 0.75.
D: Output characteristics value of 0.65 or more and less than 0.70.
E: Output characteristics value of less than 0.65.

f. Oven Test

Using the battery assembled as described above, the charged battery was heated from room temperature to 150° C. at a rate of 5° C./minute, allowed to stand at 150° C. for a prescribed time, and then the ignition status was confirmed. The results on the oven test were evaluated and ranked according to the following criteria.

A: No occurrence of ignition even after 90 minutes
B: Occurrence of ignition when allowed to stand for 60 minutes or longer and shorter than 90 minutes
C: Occurrence of ignition when allowed to stand for 30 minutes or longer and shorter than 60 minutes
D: Occurrence of ignition when allowed to stand for 10 minutes or longer and shorter than 30 minutes
E: Occurrence of ignition when allowed to stand for shorter than 10 minutes g. Nail Puncture Evaluation Using the battery assembled as described above, the charged battery was left to stand on the iron plate in the explosion-proof booth. An iron nail having a diameter of 2.5 mm was punctured and penetrated at the center of the battery at a rate of 3 mm/second under an environment of 25° C., and stayed penetrated. The surface temperature of the battery was measured and evaluated as follows based on the maximum temperature reached.

A: 50° C. or lower
B: Higher than 50° C. and 80° C. or lower.
C: Higher than 80° C. and 100° C. or lower
D: Higher than 100° C.
E: Ignition or explosion Example 1

11.5 parts by weight of high density polyethylene "SH800" (manufactured by Asahi Kasei Corp.) having a viscosity-average molecular weight (Mv) of 250,000 and a density of 0.957 g/cm$^3$, 7.7 parts by weight of ultrahigh molecular weight polyethylene "UH850" (manufactured by Asahi Kasei Corp.) having Mv of 2,000,000 and a density of 0.937 g/cm$^3$, 12.8 parts by weight of silica "R972" (manufactured by Nippon Aerosil Co., Ltd.) having an average primary particle diameter of 15 nm, 15.4 parts by weight of liquid paraffin (LP) "Smoyl P-350P" (manufactured by Matsumura Oil Research Co., Ltd.) as a plasticizer, and 0.1 parts by weight of pentaerythrityl-tetrakis-[3-(3,5-di-t-butyl-4-hydroxyphenyl)propionate] as an antioxidant, were premixed with a supermixer. The obtained mixture was supplied to the feed port of co-directional twin-screw extruder by a feeder. Moreover, liquid paraffin was added by side feeding to the twin-screw extruder cylinder in two portions so that the liquid paraffin content proportion in the total mixture (100 parts by weight) to be melt-kneaded and extruded, was 68 parts by weight. In this case, the addition proportion of the two portions was set to 1st/2nd=7/3. The melt-kneading was carried out under the conditions of a number of screw rotation of 60 rpm and an extrusion amount of 65 kg/h. The Q/N ratio (Q: extrusion amount [kg/hr], N: number of screw rotation [rpm]) in this case was 1.08. The set temperature was 160° C. for the kneading section and 230° C. for the T die. Subsequently, the melt-kneaded product was extruded into sheet form from the T-die and cooled with a cooling roll controlled at a surface temperature of 70° C. to obtain a sheet molding with a thickness of 1800 µm.

The obtained sheet molding was introduced to a TD uniaxial tenter to obtain a primary stretched membrane (primary stretching step). The set stretching conditions were a TD stretching ratio of 9 times and a TD stretching temperature of 117° C. Next, the obtained primary stretched membrane was introduced into a methylene chloride bath and sufficiently immersed to extract and remove liquid paraffin as a plasticizer followed by removal and drying of methylene chloride to obtain a porous membrane.

The resulting porous membrane was introduced to a MD uniaxial roll stretching machine to obtain a secondary stretched membrane (secondary stretching step). The set stretching conditions for this secondary stretching were a MD stretching of 4.25 times and a MD stretching temperature of 120° C. Subsequently, the secondary stretched membrane was introduced to a TD uniaxial tenter for heat setting. Additionally, the ratio of the maximum strain rate (primary stretching maximum strain rate/secondary stretching maximum strain rate) was 0.04.

As a heat setting step, after a stretching operation was carried out at a stretching temperature of 135° C. and a stretching ratio of 1.6 times, a relaxation operation at a relaxation temperature of 144° C. and a relaxation rate of 10% was carried out. Various characteristics of the obtained PO microporous membrane were evaluated by the above methods. The results are shown in Table 5.

Additionally, the obtained microporous membrane was burned at 600° C. for 30 minutes, and the amount of silica was calculated from the remaining weight. As a result, it was 39.8% by weight, indicating that the blended silica remained almost unextracted.

Table 5 shows the characteristics of the microporous membrane.

Examples 2 to 11 and Comparative Examples 1 to 5

Figure 2:
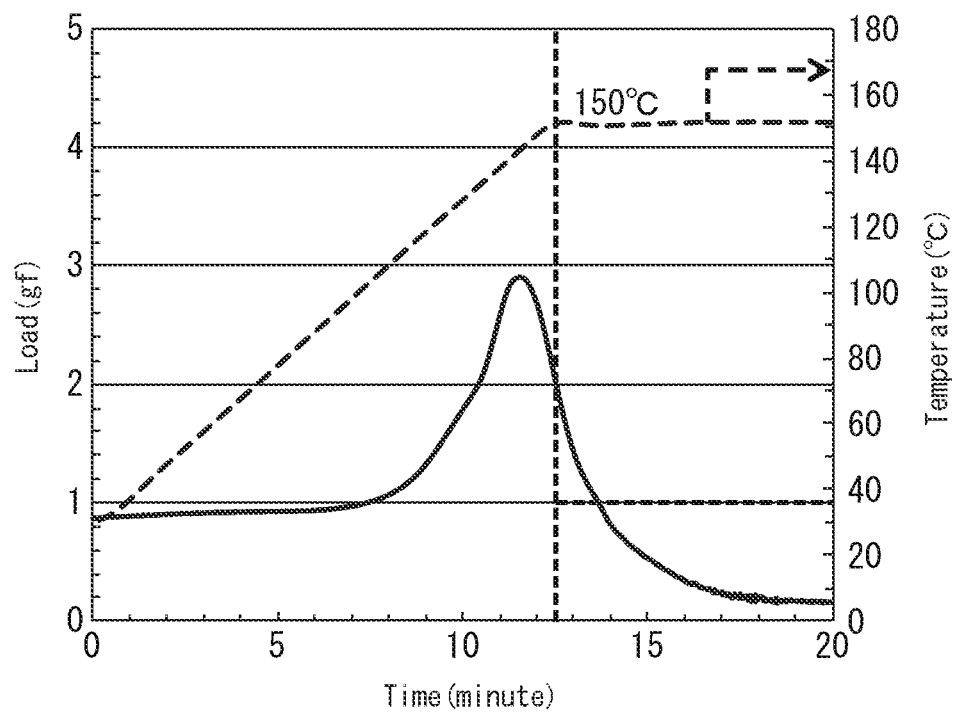
FIG. 2 is a graph illustrating a result on the thermal behavior evaluation (1) of thermal mechanical analysis (TMA) in Example 2.
Figure 5:
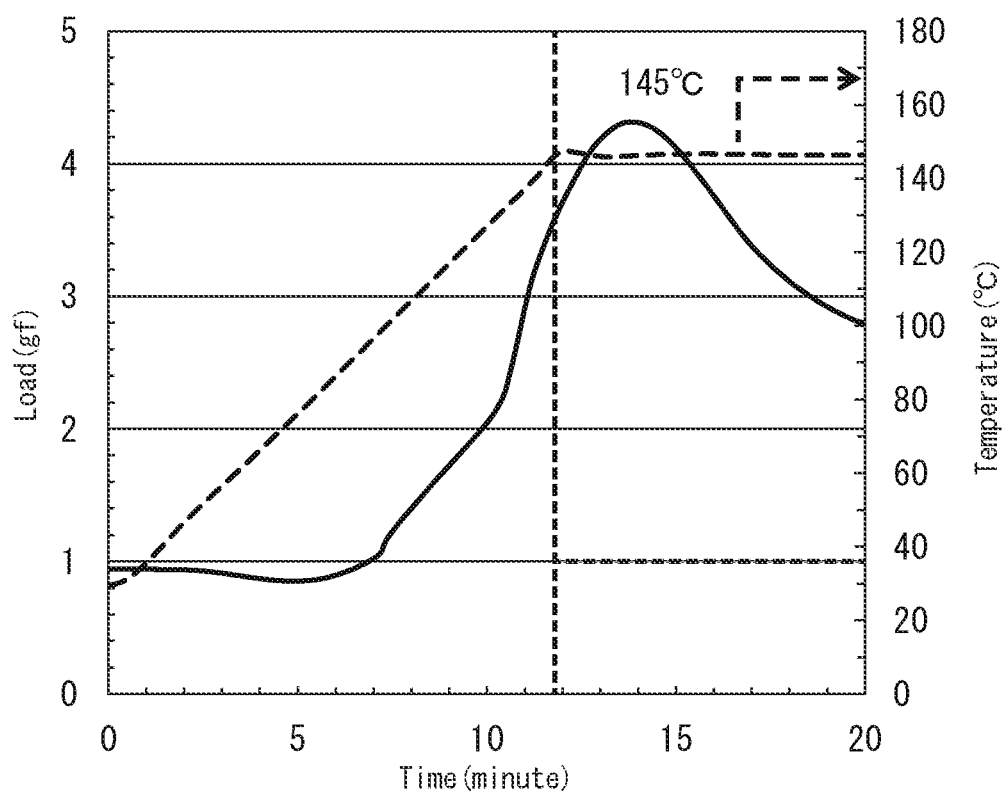
FIG. 5 is a graph illustrating a result on the thermal behavior evaluation (2) of thermal mechanical analysis (TMA) in Comparative Example 2.

A PO microporous membrane was obtained in the same manner as in Example 1 with the exception of setting the crude raw material constitution, kneading conditions, primary stretching ratio, primary stretching temperature, secondary stretching ratio, secondary stretching temperature, and stretching ratio, stretching temperature, relaxation temperature, and relaxation rate in the heat setting step, respectively to those in Table 1 or 3. Moreover, when the stretching ratio is not described in the table, the membrane was not passed through the MD uniaxial roll stretching machine and the TD uniaxial tenter. Various characteristics of the obtained PO microporous membrane were evaluated by the above methods. The results are shown in Table 5 or 7. Moreover, the result on the thermal behavior evaluation by TMA in Example 2 is shown in FIG. 2, and the result on thermal behavior evaluation in Comparative Example 2 is shown in FIG. 5.

Example 12

13.9 parts by weight of high density polyethylene having a viscosity-average molecular weight (Mv) of 250,000 and a density of 0.957 g/cm$^3$, 13.6 parts by weight of ultrahigh molecular weight polyethylene having Mv of 700,000 and a density of 0.937 g/cm$^3$, 1.4 parts by weight of polypropylene having a viscosity-average molecular weight (Mv) of 400,000, 5.1 parts by weight of silica having an average primary particle diameter of 16 nm, 6.1 parts by weight of liquid paraffin as a plasticizer, and 0.1 parts by weight of pentaerythrityl-tetrakis-[3-(3,5-di-t-butyl-4-hydroxyphenyl)propionate] as an antioxidant, were premixed with a supermixer. The obtained mixture was supplied to the feed port of co-directional twin-screw extruder by a feeder. Moreover, liquid paraffin was added by side feeding to the twin-screw extruder cylinder in two portions so that the liquid paraffin content proportion in the total mixture (100 parts by weight) to be melt-kneaded and extruded, was 66 parts by weight. In this case, the addition proportion of the two portions was set to 1 st/2nd=7/3. The melt-kneading was carried out under the conditions of a number of screw rotation of 83 rpm and an extrusion amount of 100 kg/h. The Q/N ratio (Q: extrusion amount [kg/hr], N: number of screw rotation [rpm]) in this case was 1.20. The set temperature was 160° C. for the kneading section and 200° C. for the T die. Subsequently, the melt-kneaded product was extruded into sheet form from the T-die and cooled with a cooling roll controlled at a surface temperature of 70° C. to obtain a sheet molding with a thickness of 1450 µm.

The obtained sheet molding was introduced to a simultaneous biaxial stretching machine to obtain a primary stretched membrane (primary stretching step). The set stretching conditions were a MD stretching ratio of 7 times, a TD stretching ratio of 6.5 times and a stretching temperature of 119° C. Next, the obtained primary stretched membrane was introduced into a methylene chloride bath and sufficiently immersed to extract and remove liquid paraffin as a plasticizer followed by drying and removal of methylene chloride to obtain an extracted membrane.

Subsequently, the extracted membrane was introduced to a TD uniaxial tenter for heat setting.

As a heat setting step, after a stretching operation was carried out at a stretching temperature of 123° C. and a stretching ratio of 1.95 times, a relaxation operation at a relaxation temperature of 131° C. and a relaxation ratio of 21% was carried out. Various characteristics of the obtained PO microporous membrane were evaluated by the above methods. The results are shown in Table 6.

Moreover, the obtained microporous membrane was burned at 600° C. for 30 minutes, and the amount of silica was calculated from the remaining weight. As a result, it was 14.98% by weight, indicating the blended silica remained almost unextracted.

Table 6 shows the characteristics of the microporous membrane.

Examples 13 to 24 and Comparative Examples 6 to 15

Figure 3:
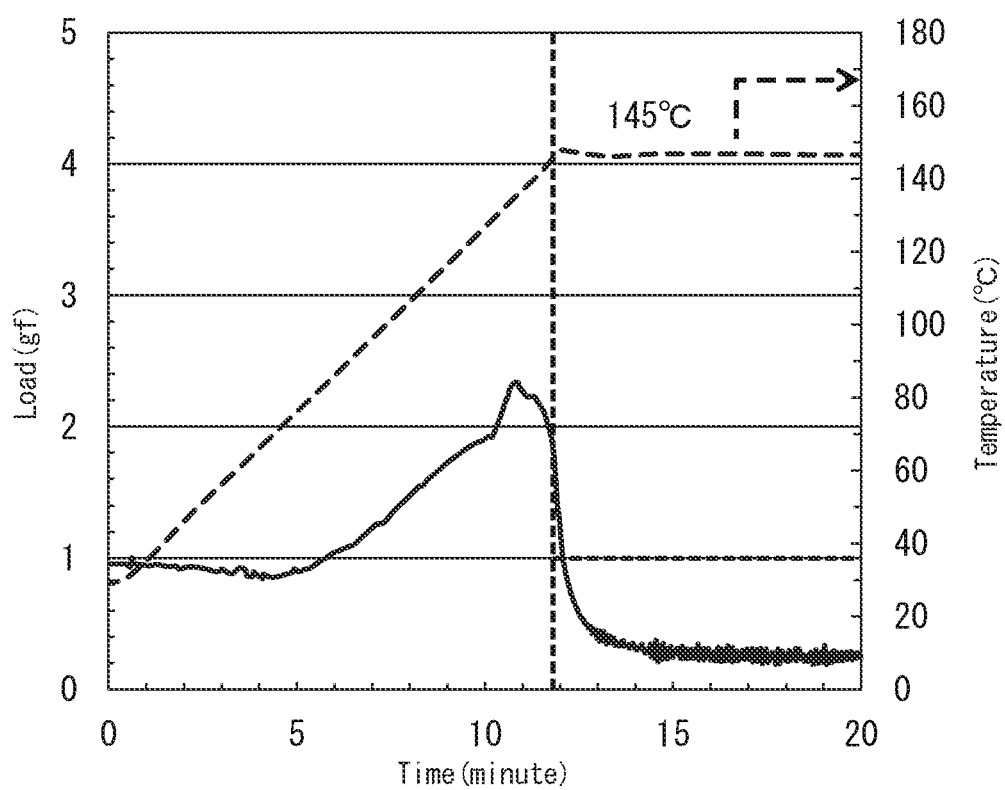
FIG. 3 is a graph illustrating a result on the thermal behavior evaluation (2) of thermal mechanical analysis (TMA) in Example 13.
Figure 4:
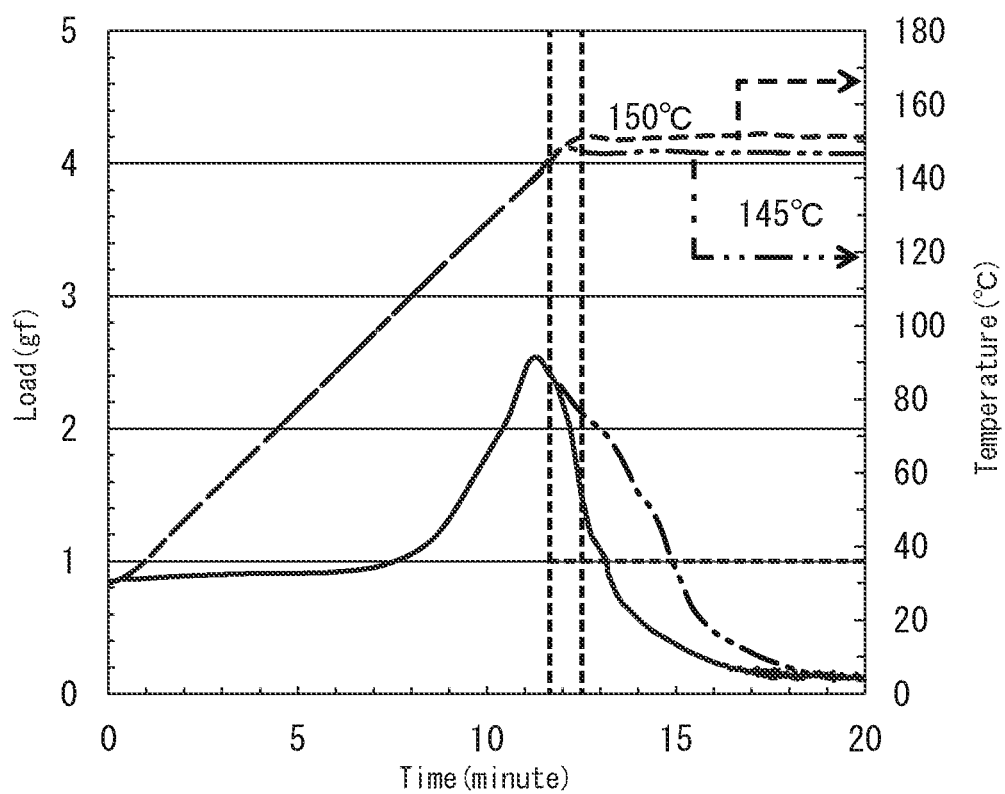
FIG. 4 is a graph illustrating results on the thermal behavior evaluations (1) and (2) of thermal mechanical analysis (TMA) in Example 15.
Figure 6:
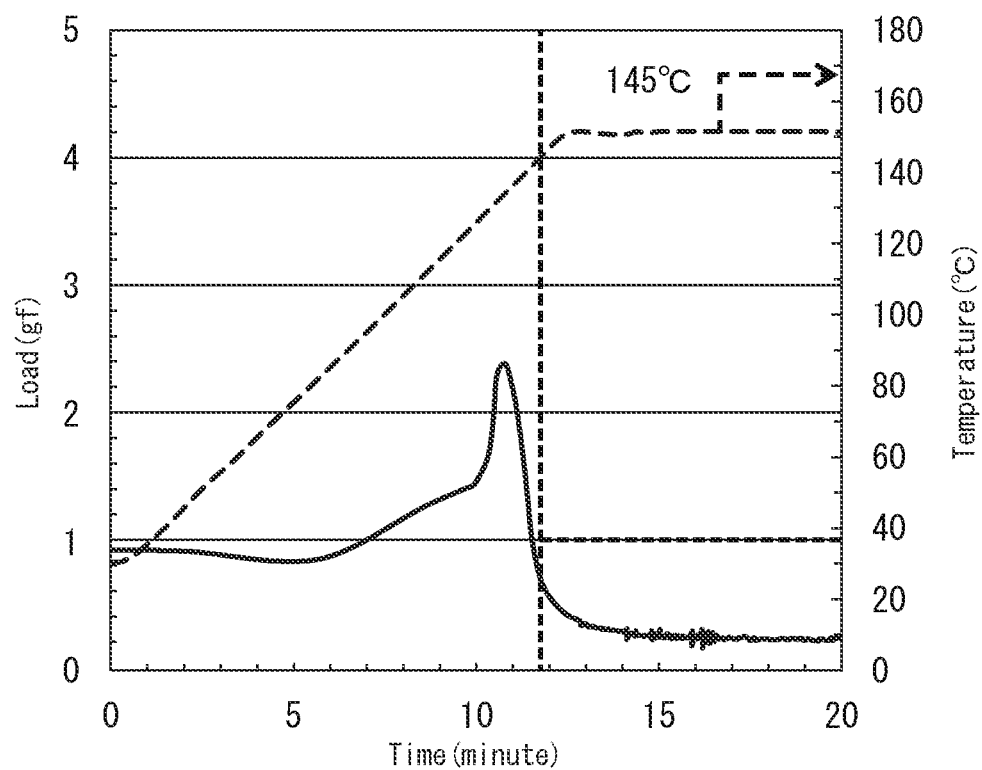
FIG. 6 is a graph illustrating a result on the thermal behavior evaluation (2) of thermal mechanical analysis (TMA) in Comparative Example 9.

A PO microporous membrane was obtained in the same manner as in Example 13 with the exception of setting the crude raw material constitution, kneading conditions, primary stretching ratio, primary stretching temperature, and stretching ratio, stretching temperature, relaxation temperature, and relaxation rate in the heat setting step, respectively to those in Table 2 or 4. Moreover, when the stretching ratio is not described in the table, the membrane was not passed through the MD uniaxial roll stretching machine and the TD uniaxial tenter. Various characteristics of the obtained PO microporous membrane were evaluated by the above methods. The results are shown in Table 6 or 8. In Comparative Example 11, the membrane was ruptured upon the primary stretching and could not be obtained. Moreover, the results on the thermal behavior evaluation in Examples 13 and 15 and Comparative Example 9 are shown in FIGS. 3, 4 and 6, respectively.

TABLE 1

| Membrane fabrication conditions | | | | Example 1 | Example 2 | Example 3 | Example 4 | Example 5 | Example 6 |
|---|---|---|---|---|---|---|---|---|---|
| Raw materials | PE1 | | Mv | 200 | 200 | 200 | 120 | 110 | 70 |
| | | | g/cm³ | 0.937 | 0.937 | 0.937 | 0.950 | 0.950 | 0.937 |
| | PE2 | | Mv | 25 | 25 | 25 | 25 | — | 25 |
| | | | g/cm³ | 0.957 | 0.957 | 0.957 | 0.957 | — | 0.947 |
| | PP | | Mv | — | — | — | — | — | 40 |
| | Inorganic particles | | — | SiO₂ | SiO₂ | SiO₂ | SiO₂ | SiO₂ | SiO₂ |
| | Particle diameter of inorganic particles | | nm | 15 | 15 | 15 | 15 | 15 | 15 |
| | Plasticizer | | — | LP | LP | LP | LP | LP | LP |
| Proportion of raw materials | PE1 | | wt % | 7.7 | 10.2 | 11.5 | 11.5 | 28.8 | 12.2 |
| | PE2 | | wt % | 11.5 | 15.4 | 17.3 | 17.3 | — | 12.2 |
| | PP | | wt % | — | — | — | — | — | 1.3 |
| | Inorganic particles | | wt % | 12.8 | 6.4 | 3.2 | 3.2 | 3.2 | 6.4 |
| | Plasticizer | | wt % | 68 | 68 | 68 | 68 | 68 | 68 |
| Concentration of inorganic particles in membrane | | | wt % | 40 | 20 | 10 | 10 | 20 | 20 |
| Extraction temperature | Kneading | | ° C. | 160 | 160 | 160 | 160 | 160 | 160 |
| | Extrusion | | ° C. | 230 | 230 | 230 | 230 | 230 | 230 |
| | Extrusion amount (Q) | | kg/hr | 65 | 65 | 65 | 65 | 65 | 65 |
| | Number of rotation (N) | | rpm | 60 | 60 | 80 | 80 | 80 | 60 |
| | Q/N | | — | 1.08 | 1.08 | 0.81 | 0.81 | 0.81 | 1.08 |
| | Number of addition of plasticizer | | times | 2 | 2 | 2 | 2 | 2 | 2 |
| | Proportion of plasticizer added First time/second time/.../nth time | | | 7/3 | 7/3 | 7/3 | 7/3 | 7/3 | 6/4 |
| | Sheet thickness | | μm | 1800 | 1800 | 1400 | 1400 | 1400 | 1650 |
| Primary stretching | Longitudinal stretching ratio | | times | — | — | — | — | — | — |
| | Longitudinal stretching temperature | | ° C. | — | — | — | — | — | — |
| | Transverse stretching ratio | | times | 9 | 9 | 9 | 9 | 9 | 9 |
| | Transverse stretching temperature | | ° C. | 117 | 117 | 117 | 117 | 117 | 117 |
| Secondary stretching | Longitudinal stretching ratio | | times | 4.25 | 4.25 | 4.25 | 4.25 | 4.25 | 4.25 |
| | Longitudinal stretching temperature | | ° C. | 120 | 120 | 120 | 120 | 120 | 120 |
| Heat setting | Transverse stretching ratio | | times | 1.6 | 1.6 | 1.6 | 1.6 | 1.6 | 1.7 |
| | Transverse stretching temperature | | ° C. | 135 | 135 | 135 | 135 | 135 | 135 |
| | Relaxation ratio | | % | 10 | 10 | 10 | 10 | 10 | 24 |
| | Relaxation temperature | | ° C. | 144 | 144 | 144 | 142 | 147 | 144 |
| | Ratio of maximum strain rate | | | 0.04 | 0.05 | 0.45 | 0.45 | 0.45 | 0.44 |

| Membrane fabrication conditions | | | | Example 7 | Example 8 | Example 9 | Example 10 | Example 11 |
|---|---|---|---|---|---|---|---|---|
| Raw materials | PE1 | | Mv | 200 | 200 | 200 | 200 | 200 |
| | | | g/cm³ | 0.937 | 0.937 | 0.937 | 0.937 | 0.937 |
| | PE2 | | Mv | 25 | 25 | 25 | 25 | 25 |
| | | | g/cm³ | 0.957 | 0.957 | 0.957 | 0.957 | 0.957 |
| | PP | | Mv | — | — | — | — | — |
| | Inorganic particles | | — | SiO₂ | SiO₂ | SiO₂ | SiO₂ | SiO₂ |
| | Particle diameter of inorganic particles | | nm | 15 | 15 | 15 | 15 | 15 |
| | Plasticizer | | — | LP | LP | LP | LP | LP |
| Proportion of raw materials | PE1 | | wt % | 10.2 | 10.2 | 10.2 | 10.2 | 10.2 |
| | PE2 | | wt % | 15.4 | 15.4 | 15.4 | 15.4 | 15.4 |
| | PP | | wt % | — | — | — | — | — |
| | Inorganic particles | | wt % | 6.4 | 6.4 | 6.4 | 6.4 | 6.4 |
| | Plasticizer | | wt % | 68 | 68 | 68 | 68 | 68 |
| Concentration of inorganic particles in membrane | | | wt % | 20 | 20 | 20 | 20 | 20 |
| Extraction temperature | Kneading | | ° C. | 160 | 160 | 200 | 160 | 200 |
| | Extrusion | | ° C. | 230 | 230 | 220 | 230 | 220 |
| | Extrusion amount (Q) | | kg/hr | 65 | 65 | 65 | 65 | 65 |
| | Number of rotation (N) | | rpm | 80 | 60 | 65 | 50 | 80 |
| | Q/N | | — | 0.81 | 1.08 | 1.00 | 1.30 | 0.81 |
| | Number of addition of plasticizer | | times | 2 | 2 | 2 | 2 | 2 |
| | Proportion of plasticizer added First time/second time/.../nth time | | | 7/3 | 7/3 | 7/3 | 7/3 | 9/1 |
| | Sheet thickness | | μm | 1800 | 1800 | 2000 | 1800 | 2000 |

TABLE 1-continued

|  |  |  |  |  |  |  |  |
|---|---|---|---|---|---|---|---|
| Primary stretching | Longitudinal stretching ratio | times | — | — | — | 7 | — |
|  | Longitudinal stretching temperature | °C. | — | — | — | 120 | — |
|  | Transverse stretching ratio | times | 9 | 9 | 8 | 6.4 | 8 |
|  | Transverse stretching temperature | °C. | 117 | 117 | 117 | 122 | 114 |
| Secondary stretching | Longitudinal stretching ratio | times | 4.25 | 4.25 | 4.25 | — | 4.25 |
|  | Longitudinal stretching temperature | °C. | 120 | 120 | 120 | — | 120 |
| Heat setting | Transverse stretching ratio | times | 1.5 | 1.84 | 1.84 | 1.84 | 1.84 |
|  | Transverse stretching temperature | °C. | 135 | 135 | 135 | 135 | 135 |
|  | Relaxation ratio | % | 20 | 10 | 10 | 10 | 10 |
|  | Relaxation temperature | °C. | 139 | 144 | 144 | 144 | 144 |
|  | Ratio of maximum strain rate |  | 0.04 | 0.05 | 0.05 | — | 0.05 |

TABLE 2

| Membrane fabrication conditions |  |  | Example 12 | Example 13 | Example 14 | Example 15 | Example 16 | Example 17 | Example 18 |
|---|---|---|---|---|---|---|---|---|---|
| Raw materials | PE1 | Mv | 70 | 70 | 95 | 70 | 70 | 95 | 95 |
|  |  | g/cm³ | 0.937 | 0.937 | 0.940 | 0.937 | 0.937 | 0.940 | 0.940 |
|  | PE2 | Mv | 25 | 25 | 25 | 25 | 25 | 25 | 25 |
|  |  | g/cm³ | 0.957 | 0.957 | 0.957 | 0.957 | 0.957 | 0.957 | 0.957 |
|  | PP | Mv | 40 | 40 | 40 | 40 | 40 | 40 | — |
|  | Inorganic particles | — | $SiO_2$ | $SiO_2$ | $SiO_2$ | $SiO_2$ | $SiO_2$ | $SiO_2$ | $SiO_2$ |
|  | Particle diameter of inorganic particles | nm | 16 | 18 | 25 | 16 | 30 | 15 | 16 |
|  | Plasticizer | — | LP | LP | LP | LP | LP | LP | LP |
| Proportion of raw materials | PE1 | wt % | 13.6 | 12.6 | 15.8 | 11.2 | 8.2 | 12.2 | 16.6 |
|  | PE2 | wt % | 13.9 | 14.0 | 14.2 | 10.1 | 11.2 | 12.2 | 10.2 |
|  | PP | wt % | 1.4 | 1.4 | 1.6 | 1.1 | 1.0 | 2.7 | 0.0 |
|  | Inorganic particles | wt % | 5.1 | 5.0 | 3.5 | 9.6 | 13.6 | 6.8 | 6.4 |
|  | Plasticizer | wt % | 66.0 | 67.0 | 65.0 | 68.0 | 66.0 | 66.0 | 68.0 |
|  | Concentration of inorganic particles in membrane | wt % | 15 | 15 | 10 | 30 | 40 | 20 | 20 |
| Extraction temperature | Kneading | °C. | 160 | 160 | 160 | 160 | 160 | 180 | 200 |
|  | Extrusion | °C. | 200 | 200 | 200 | 200 | 200 | 200 | 200 |
|  | Extrusion amount (Q) | kg/hr | 100 | 100 | 110 | 110 | 100 | 100 | 100 |
|  | Number of rotation (N) | rpm | 83 | 100 | 92 | 92 | 100 | 100 | 90 |
|  | Q/N | — | 1.20 | 1.00 | 1.20 | 1.20 | 1.00 | 1.00 | 1.11 |
|  | Number of addition of plasticizer | times | 2 | 2 | 2 | 2 | 2 | 2 | 2 |
|  | Proportion of plasticizer added First time/second time/.../nth time | nth time | 7/3 | 8/2 | 7/3 | 7/3 | 8/2 | 7/3 | 7/3 |
|  | Sheet thickness | μm | 1450 | 1500 | 1400 | 1400 | 1450 | 1500 | 1500 |
| Primary stretching | Longitudinal stretching ratio | times | 7 | 7 | 7 | 7 | 7 | 7 | 7 |
|  | Longitudinal stretching temperature | °C. | 119 | 120 | 120 | 120 | 120 | 120 | 121 |
|  | Transverse stretching ratio | times | 6.5 | 6.5 | 6.4 | 6.4 | 7 | 6 | 6 |
|  | Transverse stretching temperature | °C. | 119 | 120 | 120 | 120 | 120 | 120 | 121 |
| Secondary stretching | Longitudinal stretching ratio | times | — | — | — | — | — | — | — |
|  | Longitudinal stretching temperature | °C. | — | — | — | — | — | — | — |
| Heat setting | Transverse stretching ratio | times | 1.95 | 1.9 | 1.9 | 1.95 | 1.9 | 1.8 | 2 |
|  | Transverse stretching temperature | °C. | 123 | 121 | 120 | 122 | 125 | 120 | 125 |
|  | Relaxation ratio | % | 21 | 20 | 15 | 21 | 20 | 15 | 20 |
|  | Relaxation temperature | °C. | 131 | 126 | 131 | 132 | 132 | 134 | 132 |
|  | Ratio of maximum strain rate |  | — | — | — | — | — | — | — |

| Membrane fabrication conditions |  |  | Example 19 | Example 20 | Example 21 | Example 22 | Example 23 | Example 24 |
|---|---|---|---|---|---|---|---|---|
| Raw materials | PE1 | Mv | 70 | 95 | 95 | 70 | 70 | 70 |
|  |  | g/cm³ | 0.937 | 0.940 | 0.940 | 0.937 | 0.937 | 0.937 |
|  | PE2 | Mv | 25 | 25 | 25 | 25 | 25 | 25 |
|  |  | g/cm³ | 0.957 | 0.957 | 0.957 | 0.957 | 0.957 | 0.957 |
|  | PP | Mv | — | 40 | 40 | 40 | 40 | 40 |
|  | Inorganic particles | — | $SiO_2$ | $SiO_2$ | $SiO_2$ | ZnO | $SiO_2$ | $SiO_2$ |
|  | Particle diameter of inorganic particles | nm | 15 | 20 | 80 | 20 | 15 | 20 |
|  | Plasticizer | — | LP | LP | LP | LP | LP | LP |
| Proportion of raw materials | PE1 | wt % | 7.0 | 14.0 | 10.2 | 11.8 | 10.7 | 14.6 |
|  | PE2 | wt % | 21.0 | 14.0 | 12.8 | 11.8 | 10.7 | 16.2 |
|  | PP | wt % | 0.0 | 0.0 | 2.6 | 2.0 | 1.4 | 1.6 |
|  | Inorganic particles | wt % | 7.0 | 5.0 | 6.4 | 6.4 | 12.3 | 3.6 |
|  | Plasticizer | wt % | 65.0 | 67.0 | 68.0 | 68.0 | 65.0 | 64.0 |
|  | Concentration of inorganic particles in membrane | wt % | 20 | 15 | 20 | 20 | 35 | 10 |
| Extraction temperature | Kneading | °C. | 160 | 200 | 190 | 190 | 190 | 160 |
|  | Extrusion | °C. | 180 | 210 | 200 | 200 | 200 | 200 |
|  | Extrusion amount (Q) | kg/hr | 110 | 90 | 85 | 85 | 85 | 100 |
|  | Number of rotation (N) | rpm | 110 | 90 | 70 | 70 | 70 | 92 |

TABLE 2-continued

| | | | | | | | | |
|---|---|---|---|---|---|---|---|---|
| | Q/N | — | 1.00 | 1.00 | 1.21 | 1.21 | 1.21 | 1.09 |
| | Number of addition of plasticizer | times | 2 | 2 | 2 | 2 | 2 | 2 |
| | Proportion of plasticizer added First time/second time/.../nth time | | 6/4 | 7/3 | 6/4 | 8/2 | 6/4 | 8/2 |
| | Sheet thickness | μm | 1550 | 1400 | 1300 | 1500 | 1400 | 1400 |
| Primary stretching | Longitudinal stretching ratio | times | 8 | 6 | 6 | 7 | 6 | 7 |
| | Longitudinal stretching temperature | °C. | 120 | 119 | 118 | 119 | 118 | 119 |
| | Transverse stretching ratio | times | 7 | 6 | 7 | 6 | 7 | 6.5 |
| | Transverse stretching temperature | °C. | 120 | 119 | 118 | 119 | 118 | 119 |
| Secondary stretching | Longitudinal stretching ratio | times | — | — | — | — | — | — |
| | Longitudinal stretching temperature | °C. | — | — | — | — | — | — |
| Heat setting | Transverse stretching ratio | times | 1.6 | 2 | 2 | 1.8 | 1.9 | 1.9 |
| | Transverse stretching temperature | °C. | 123 | 126 | 125 | 122 | 125 | 119 |
| | Relaxation ratio | % | 15 | 21 | 25 | 20 | 25 | 15 |
| | Relaxation temperature | °C. | 132 | 131 | 132 | 131 | 132 | 128 |
| | Ratio of maximum strain rate | | — | — | — | — | — | — |

TABLE 3

| Membrane fabrication conditions | | | Comparative Example 1 | Comparative Example 2 | Comparative Example 3 | Comparative Example 4 | Comparative Example 5 |
|---|---|---|---|---|---|---|---|
| Raw materials | PE1 | Mv | 200 | 200 | 200 | 200 | 200 |
| | | g/cm³ | 0.937 | 0.937 | 0.937 | 0.937 | 0.937 |
| | PE2 | Mv | 25 | 25 | 25 | 25 | 25 |
| | | g/cm³ | 0.957 | 0.957 | 0.957 | 0.957 | 0.957 |
| | PP | Mv | — | — | — | — | — |
| | Inorganic particles | | SiO₂ | SiO₂ | — | SiO₂ | SiO₂ |
| | Particle diameter of inorganic particles | nm | 500 | 15 | — | 15 | 15 |
| | Plasticizer | | LP | LP | LP | LP | LP |
| Proportion of raw materials | PE1 | wt % | 10.2 | 7.7 | 12.8 | 12.2 | 3.2 |
| | PE2 | wt % | 15.4 | 11.5 | 19.2 | 18.2 | 4.8 |
| | PP | wt % | — | — | — | — | — |
| | Inorganic particles | wt % | 6.4 | 12.8 | — | 1.6 | 24 |
| | Plasticizer | wt % | 68 | 68 | 68 | 68 | 68 |
| | Concentration of inorganic particles in membrane | wt % | 20 | 40 | — | 5 | 75 |
| Extraction temperature | Kneading | °C. | 200 | 200 | 200 | 200 | 200 |
| | Extrusion | °C. | 220 | 220 | 200 | 200 | 200 |
| | Extrusion amount (Q) | kg/hr | 18 | 18 | 10 | 10 | 10 |
| | Number of rotation (N) | rpm | 80 | 180 | 100 | 100 | 100 |
| | Q/N | — | 0.23 | 0.10 | 0.10 | 0.10 | 0.10 |
| | Number of addition of plasticizer | times | 1 | 2 | 3 | 3 | 3 |
| | Proportion of plasticizer added First time/second time/.../nth time | | 10/— | 9/1 | 9/1 | 9/1 | 9/1 |
| | Sheet thickness | μm | 1800 | 1800 | 1500 | 1500 | 1500 |
| Primary stretching | Longitudinal stretching ratio | times | 7 | 7 | 7 | 7 | 7 |
| | Longitudinal stretching temperature | °C. | 120 | 120 | 120 | 120 | 120 |
| | Transverse stretching ratio | times | 6.4 | 6.4 | 7 | 7 | 7 |
| | Transverse stretching temperature | °C. | 122 | 122 | 126/140 | 126/140 | 126/140 |
| Secondary stretching | Longitudinal stretching ratio | times | — | — | — | — | — |
| | Longitudinal stretching temperature | °C. | — | — | — | — | — |
| Heat setting | Transverse stretching ratio | times | 1.84 | 1.84 | 1.84 | 1.84 | 1.84 |
| | Transverse stretching temperature | °C. | 135 | 135 | 135 | 135 | 135 |
| | Relaxation ratio | % | 10 | 10 | 10 | 10 | 10 |
| | Relaxation temperature | °C. | 139 | 144 | 117 | 117 | 117 |
| | Ratio of maximum strain rate | | 10.2 | 7.5 | 7.7 | 10.1 | 10.1 |

TABLE 4

| Membrane fabrication conditions | | | Comparative Example 6 | Comparative Example 7 | Comparative Example 8 | Comparative Example 9 | Comparative Example 10 |
|---|---|---|---|---|---|---|---|
| Raw materials | PE1 | Mv | 70 | 200 | 100 | 70 | 100 |
| | | g/cm³ | 0.937 | 0.937 | 0.940 | 0.937 | 0.940 |
| | PE2 | Mv | 25 | 27 | 27 | — | 25 |
| | | g/cm³ | 0.957 | 0.955 | 0.955 | — | 0.957 |
| | PP | Mv | 40 | — | — | — | 40 |
| | Inorganic particles | | SiO₂ | ZnO | ZnO | SiO₂ | SiO₂ |
| | Particle diameter of inorganic particles | nm | 15 | 20 | 20 | 7 | 15 |
| | Plasticizer | | LP | LP | LP | LP | LP |
| Proportion of raw materials | PE1 | wt % | 14.1 | 12.8 | 10.2 | 34.0 | 14.5 |
| | PE2 | wt % | 15.7 | 19.2 | 15.4 | — | 13.0 |
| | PP | wt % | 1.6 | — | — | — | 1.4 |

TABLE 4-continued

|  |  |  |  |  |  |  |  |
|---|---|---|---|---|---|---|---|
|  | Inorganic particles | wt % | 1.7 | 8.0 | 6.4 | 6.0 | 5.1 |
|  | Plasticizer | wt % | 67.0 | 60.0 | 68.0 | 60.0 | 66.0 |
|  | Concentration of inorganic particles in membrane | wt % | 5 | 20 | 20 | 15 | 15 |
| Extraction temperature | Kneading | ° C. | 200 | 200 | 180 | 200 | 160 |
|  | Extrusion | ° C. | 200 | 200 | 180 | 200 | 190 |
|  | Extrusion amount (Q) | kg/hr | 18 | 18 | 16 | 18 | 85 |
|  | Number of rotation (N) | rpm | 180 | 180 | 100 | 180 | 90 |
|  | Q/N | — | — | 0.10 | 0.10 | 0.16 | 0.10 | 0.94 |
|  | Number of addition of plasticizer | times | 2 | 2 | 2 | 2 | 2 |
|  | Proportion of plasticized added First time/second time/.../nth time |  | 8/2 | 7/3 | 8/2 | 8/2 | 8/2 |
|  | Sheet thickness | μm | 1800 | 2000 | 1450 | 1750 | 1600 |
| Primary stretching | Longitudinal stretching temperature | times | 7 | 7 | 7 | 7 | 7 |
|  | Longitudinal stretching temperature | ° C. | 120 | 120 | 122 | 115 | 120 |
|  | Transverse stretching ratio | times | 7 | 7 | 6.1 | 7 | 7 |
|  | Transverse stretching temperature | ° C. | 120 | 120 | 122 | 115 | 120 |
| Secondary stretching | Longitudinal stretching ratio | times | — | — | — | — | — |
|  | Longitudinal stretching temperature | ° C. | — | — | — | — | — |
| Heat setting | Transverse stretching ratio | times | 1.84 | — | 1.7 | — | 1.6 |
|  | Transverse stretching temperature | ° C. | 125 | — | 125 | — | 118 |
|  | Relaxation ratio | % | 10 | — | 12 | — | 15 |
|  | Relaxation temperature | ° C. | 131 | — | 130 | — | 122 |
|  | Ratio of maximum strain rate |  | — | — | — | — | — |

| Membrane fabrication conditions |  |  | Comparative Example 11 | Comparative Example 12 | Comparative Example 13 | Comparative Example 14 | Comparative Example 15 |
|---|---|---|---|---|---|---|---|
| Raw materials | PE1 | Mv | 70 | 100 | 100 | 200 | 120 |
|  |  | g/cm³ | 0.937 | 0.940 | 0.940 | 0.937 | 0.942 |
|  | PE2 | Mv | 25 | 25 | 25 | 100 | 25 |
|  |  | g/cm³ | 0.957 | 0.957 | 0.957 | 0.940 | 0.957 |
|  | PP | Mv | 40 | 40 | 40 | — | — |
|  | Inorganic particles | — | SiO₂ | SiO₂ | SiO₂ | SiO₂ | SiO₂ |
|  | Particle diameter of inorganic particles | nm | 110 | 15 | 15 | 15 | 15 |
|  | Plasticizer | — | LP | LP | LP | LP | LP |
| Proportion of raw materials | PE1 | wt % | 14.5 | 14.5 | 6.0 | 8.2 | 23.1 |
|  | PE2 | wt % | 13.0 | 13.0 | 5.4 | 19.0 | 5.8 |
|  | PP | wt % | 1.4 | 1.4 | 0.6 | 0.0 | 0.0 |
|  | Inorganic particles | wt % | 5.1 | 5.1 | 22.1 | 6.8 | 5.1 |
|  | Plasticizer | wt % | 66.0 | 66.0 | 66.0 | 66.0 | 66.0 |
|  | Concentration of inorganic particles in membrane | wt % | 15 | 15 | 65 | 20 | 15 |
| Extraction temperature | Kneading | ° C. | 160 | 160 | 160 | 180 | 180 |
|  | Extrusion | ° C. | 180 | 200 | 200 | 220 | 210 |
|  | Extrusion amount (Q) | kg/hr | 65 | 80 | 18 | 18 | 80 |
|  | Number of rotation (N) | rpm | 80 | 80 | 180 | 180 | 120 |
|  | Q/N | — | 0.81 | 1.00 | 0.10 | 0.10 | 0.67 |
|  | Number of addition of plasticizer | times | 2 | 2 | 2 | 2 | 2 |
|  | Proportion of plasticizer added First time/second time/.../nth time |  | 7/3 | 7/3 | 7/3 | 8/2 | 8/2 |
|  | Sheet thickness | μm | 1500 | 1550 | 1400 | 1400 | 1500 |
| Primary stretching | Longitudinal stretching ratio | times | 7 | 7 | 6 | 7 | 6 |
|  | Longitudinal stretching temperature | ° C. | 121 | 120 | 118 | 120 | 119 |
|  | Transverse stretching ratio | times | 7 | 7 | 6 | 6.5 | 6 |
|  | Transverse stretching temperature | ° C. | 121 | 120 | 118 | 120 | 119 |
| Secondary stretching | Longitudinal stretching ratio | times | — | — | — | — | — |
|  | Longitudinal stretching temperature | ° C. | — | — | — | — | — |
| Heat setting | Transverse stretching ratio | times | — | 1.9 | 1.8 | 1.9 | 1.95 |
|  | Transverse stretching temperature | ° C. | — | 127 | 125 | 124 | 123 |
|  | Relaxation ratio | % | — | 15 | 14 | 20 | 17 |
|  | Relaxation temperature | ° C. | — | 138 | 132 | 132 | 131 |
|  | Ratio of maximum strain rate |  | — | — | — | — | — |

TABLE 5

| Microporous membrane characteristics |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Membrane thickness | μm | 16 | 16 | 16 | 16 | 16 | 16 | 16 | 16 | 20 | 16 | 16 |
| Porosity | % | 66 | 63 | 66 | 60 | 60 | 66 | 55 | 45 | 55 | 35 | 45 |
| Permeability | second | 90 | 90 | 90 | 95 | 100 | 90 | 90 | 90 | 120 | 90 | 140 |
| Permeability | s/100 cc/μm | 5.6 | 5.6 | 5.6 | 5.9 | 6.3 | 5.6 | 5.6 | 5.6 | 6.0 | 5.6 | 8.8 |
| Puncture strength | N | 4.9 | 4.6 | 4.3 | 5.0 | 5.5 | 5.6 | 5.8 | 4.1 | 5 | 4.1 | 5.5 |
| MD tensile strength | kg/cm² | 1250 | 900 | 850 | 900 | 1200 | 900 | 1150 | 900 | 1000 | 900 | 1000 |
| TD tensile strength | kg/cm² | 870 | 870 | 770 | 850 | 1200 | 560 | 650 | 630 | 1000 | 630 | 1000 |
| Kinetic friction of coefficient | — | 0.38 | 0.36 | 0.30 | 0.26 | 0.40 | 0.45 | 0.30 | 0.30 | 0.45 | 0.30 | 0.28 |
| Heat shrinkage | % | 1.2 | 1.0 | 0.9 | 0.7 | 1.1 | 0.6 | 0.4 | 1.0 | 1.2 | 1.2 | 0.8 |

TABLE 5-continued

| Microporous membrane characteristics | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Thermal behavior evaluation 1 | second | 105 | 85 | 53 | 130 | 180 | 195 | 106 | 112 | 150 | 130 | 170 |
| Thermal behavior evaluation 2 | second | 385 | 307 | 305 | 310 | 365 | 382 | 318 | 328 | 310 | 325 | 383 |
| Microporous membrane melting point (DSC $2^{nd}$ peak) | °C. | 135 | 135 | 135 | 135 | 135 | 135 | 135 | 135 | 135 | 135 | 135 |
| Rmelt/R35(1 hour) | | 1.5 | 1.7 | 1.9 | 1.9 | 1.7 | 1.7 | 1.8 | 2.0 | 2.0 | 2.3 | 3.5 |
| Rmelt/R35(30 minutes) | | 1.0 | 1.1 | 1.1 | 1.1 | 1.1 | 1.1 | 1.1 | 1.2 | 1.2 | 1.2 | 1.2 |
| Rmelt + 10/R35 | | 2.0 | 2.1 | 2.3 | 2.3 | 2.1 | 2.1 | 2.2 | 3.2 | 3.8 | 3.3 | 5.8 |
| Battery evaluation | | | | | | | | | | | | |
| Cycle test@25° C. | | A | A | B | C | A | A | B | B | A | B | D |
| High temperature output test@100° C. | | A | A | B | B | A | A | A | B | B | C | C |
| High temperature cycle test@100° C. | | A | A | B | B | B | B | B | C | C | C | C |
| Oven test | | C | B | B | C | D | D | C | C | D | C | D |
| Nail puncture test | | D | C | C | D | D | B | C | D | D | D | D |

TABLE 6

| Microporous membrane characteristics | | Example 12 | Example 13 | Example 14 | Example 15 | Example 16 | Example 17 | Example 18 |
|---|---|---|---|---|---|---|---|---|
| Membrane thickness | μm | 15 | 19 | 14 | 15 | 15 | 15 | 16 |
| Porosity | % | 60 | 68 | 53 | 60 | 65 | 48 | 59 |
| Permeability | second | 60 | 45 | 75 | 55 | 50 | 95 | 60 |
| Permeability | s/100 cc/μm | 4.0 | 2.4 | 5.4 | 3.7 | 3.3 | 6.3 | 3.8 |
| Puncture strength | N | 3.5 | 3.4 | 3.2 | 3.5 | 3.2 | 4 | 3.8 |
| MD tensile strength | kg/cm² | 800 | 650 | 800 | 800 | 900 | 1200 | 1000 |
| TD tensile strength | kg/cm² | 1100 | 900 | 1000 | 1150 | 1100 | 1200 | 1100 |
| Kinetic friction of coefficient | — | 0.35 | 0.45 | 0.26 | 0.40 | 0.45 | 0.28 | 0.35 |
| Heat shrinkage | % | 2.5 | 5.0 | 4.0 | 1.5 | 1.0 | 1.5 | 3.0 |
| Thermal behavior evaluation 1 | second | <0 | <0 | <0 | 55 | 160 | 15 | 45 |
| Thermal behavior evaluation 2 | second | 35 | 15 | 12 | 190 | 295 | 105 | 210 |
| Microporous membrane melting point (DSC $2^{nd}$ peak) | °C. | 134 | 134 | 135 | 134 | 134 | 135 | 135 |
| Rmelt/R35(1 hour) | | 3.0 | 5.5 | 7.5 | 2.5 | 1.8 | 2.8 | 2.5 |
| Rmelt/R35(30 minutes) | | 1.2 | 2.8 | 4.5 | 1.1 | 1.1 | 1.2 | 1.1 |
| Rmelt + 10/R35 | | Short | Short | Short | 7.0 | 4.0 | Short | 5.5 |
| Battery evaluation | | | | | | | | |
| Cycle test@25° C. | | A | A | B | A | A | B | A |
| High temperature output test@100° C. | | C | D | D | B | A | D | C |
| High temperature cycle test@100° C. | | C | D | D | C | B | D | C |
| Oven test | | A | A | A | C | C | C | B |
| Nail puncture test | | A | B | A | B | D | B | C |

| Microporous membrane characteristics | | Example 19 | Example 20 | Example 21 | Example 22 | Example 23 | Example 24 |
|---|---|---|---|---|---|---|---|
| Membrane thickness | μm | 13 | 17 | 12 | 15 | 16 | 16 |
| Porosity | % | 55 | 62 | 52 | 60 | 63 | 62 |
| Permeability | second | 65 | 50 | 85 | 52 | 47 | 52 |
| Permeability | s/100 cc/μm | 5.0 | 2.9 | 7.1 | 3.5 | 2.9 | 3.3 |
| Puncture strength | N | 3 | 3.5 | 2.8 | 3.3 | 3.2 | 3.2 |
| MD tensile strength | kg/cm² | 1050 | 700 | 900 | 900 | 850 | 800 |
| TD tensile strength | kg/cm² | 1000 | 850 | 1050 | 1050 | 1000 | 950 |
| Kinetic friction of coefficient | — | 0.32 | 0.34 | 0.36 | 0.33 | 0.42 | 0.34 |
| Heat shrinkage | % | 3.1 | 2.4 | 5.5 | 2.2 | 1.3 | 6.1 |
| Thermal behavior evaluation 1 | second | <0 | <0 | <0 | 14 | 134 | <0 |
| Thermal behavior evaluation 2 | second | 20 | 12 | 100 | 76 | 263 | 2 |
| Microporous membrane melting point (DSC $2^{nd}$ peak) | °C. | 134 | 135 | 135 | 134 | 135 | 135 |
| Rmelt/R35(1 hour) | | 4.5 | 5.2 | 3.9 | 2.5 | 2.1 | 8.7 |
| Rmelt/R35(30 minutes) | | 3.1 | 3.8 | 2.0 | 1.2 | 1.1 | 5.4 |
| Rmelt + 10/R35 | | Short | Short | Short | Short | 5.3 | Short |
| Battery evaluation | | | | | | | |
| Cycle test@25° C. | | A | A | B | B | A | C |
| High temperature output test@100° C. | | D | C | D | D | B | D |
| High temperature cycle test@100° C. | | D | D | D | C | B | D |
| Oven test | | A | A | B | B | C | A |
| Nail puncture test | | A | B | B | B | C | A |

TABLE 7

| Microporous membrane characteristics | | Comparative Example 1 | Comparative Example 2 | Comparative Example 3 | Comparative Example 4 | Comparative Example 5 |
|---|---|---|---|---|---|---|
| Membrane thickness | μm | 22 | 19 | 25 | 25 | 25 |
| Porosity | % | 70 | 60 | 47 | 47 | 47 |
| Permeability | second | 40 | 70 | 330 | 330 | 330 |
| Permeability | s/100 cc/μm | 1.8 | 3.7 | 13.2 | 13.2 | 13.2 |
| Puncture strength | N | 5.8 | 5.6 | 5.3 | 5.3 | 5.3 |
| MD tensile strength | kg/cm$^2$ | 1300 | 1200 | 1360 | 1360 | 1360 |
| TD tensile strength | kg/cm$^2$ | 850 | 950 | 1000 | 1000 | 1000 |
| Kinetic friction of coefficient | — | 0.15 | 0.32 | 0.18 | 0.22 | 0.45 |
| Heat shrinkage | % | | | | | |
| Thermal behavior evaluation 1 | second | 105 | 320 | 25 | 30 | 210 |
| Thermal behavior evaluation 2 | second | 325 | 793 | 217 | 245 | 532 |
| Microporous membrane melting point (DSC 2$^{nd}$ peak) | °C. | 135 | 135 | 135 | 135 | 135 |
| Rmelt/R35 | | Short | 1.6 | 17.2 | 30.0 | Short |
|  | | Short | 1.1 | 8.2 | 13.5 | Short |
| Rmelt + 10/R35 | | Short | 2.0 | Short | Short | Short |
| Battery evaluation | | | | | | |
| Cycle test@25° C. | | E | B | E | D | A |
| High temperature output test@100° C. | | E | A | D | E | E |
| High temperature cycle test@100° C. | | E | A | E | E | E |
| Oven test | | C | E | B | B | E |
| Nail puncture test | | E | E | C | C | E |

TABLE 8

| Microporous membrane characteristics | | Comparative Example 6 | Comparative Example 7 | Comparative Example 8 | Comparative Example 9 | Comparative Example 10 |
|---|---|---|---|---|---|---|
| Membrane thickness | μm | 15 | 48 | 34 | 19 | 20 |
| Porosity | % | 52 | 78 | 79 | 49 | 72 |
| Permeability | second | 105 | 232 | 127 | 260 | 35 |
| Permeability | s/100 cc/μm | 7.0 | 4.8 | 3.7 | 13.7 | 1.8 |
| Puncture strength | N | 4.5 | 5.6 | 5 | 3.9 | 2.8 |
| MD tensile strength | kg/cm$^2$ | 1100 | 500 | 650 | 600 | 450 |
| TD tensile strength | kg/cm$^2$ | 1050 | 500 | 700 | 600 | 500 |
| Kinetic friction of coefficient | — | 0.20 | 0.33 | 0.11 | 0.52 | 0.55 |
| Heat shrinkage | % | 12.0 | 22.0 | 0.0 | 42.0 | 12.0 |
| Thermal behavior evaluation 1 | second | <0 | <0 | 250 | <0 | <0 |
| Thermal behavior evaluation 2 | second | <0 | <0 | 460 | <0 | <0 |
| Microporous membrane melting point (DSC 2$^{nd}$ peak) | °C. | 135 | 135 | 135 | 135 | 135 |
| Rmelt/R35 | | Short | 15.0 | 3.5 | 17.5 | 21.2 |
|  | | Short | 6.3 | 1.2 | 7.2 | 12.1 |
| Rmelt + 10/R35 | | Short | Short | 6.4 | Short | Short |
| Battery evaluation | | | | | | |
| Cycle test@25° C. | | B | B | B | D | B |
| High temperature output test@100° C. | | E | E | B | E | D |
| High temperature cycle test@100° C. | | D | E | C | E | E |
| Oven test | | E | E | E | E | D |
| Nail puncture test | | E | D | E | E | E |

| Microporous membrane characteristics | | Comparative Example 11 | Comparative Example 12 | Comparative Example 13 | Comparative Example 14 | Comparative Example 15 |
|---|---|---|---|---|---|---|
| Membrane thickness | μm | Membrane rupture | 12 | 17 | 16 | 18 |
| Porosity | % |  | 45 | 70 | 61 | 60 |
| Permeability | second |  | 124 | 32 | 67 | 75 |
| Permeability | s/100 cc/μm |  | 10.3 | 1.9 | 4.2 | 4.2 |
| Puncture strength | N |  | 3.1 | 2.6 | 5.4 | 4.9 |
| MD tensile strength | kg/cm$^2$ |  | 1350 | 450 | 1550 | 1400 |
| TD tensile strength | kg/cm$^2$ |  | 1450 | 500 | 1650 | 1550 |
| Kinetic friction of coefficient | — |  | 0.23 | 0.48 | 0.42 | 0.41 |
| Heat shrinkage | % |  | 1.6 | 6.7 | 4.5 | 3.5 |
| Thermal behavior evaluation 1 | second |  | <0 | 252 | 230 | 212 |

TABLE 8-continued

|  |  | | | | |
|---|---|---|---|---|---|
| Thermal behavior evaluation 2 second | | 321 | 586 | 465 | 421 |
| Microporous membrane °C. melting point (DSC 2nd peak) | | 135 | 135 | 135 | 135 |
| Rmelt/R35 | | 4.6 | 8.2 | 4.6 | 3.8 |
| | | 2.3 | 5.3 | 2.6 | 2.2 |
| Rmelt + 10/R35 | | Short | Short | Short | Short |
| Battery evaluation | | | | | |
| Cycle test@25° C. | Membrane rupture | C | A | B | A |
| High temperature output test@100° C. | | E | A | C | B |
| High temperature cycle test@100° C. | | D | A | D | D |
| Oven test | | E | E | E | E |
| Nail puncture test | | D | E | E | E |

It is noted that the term "Short" means occurrence of short-circuit in Tables 6 to 8.

EXPLANATION OF SYMBOLS

1 Microporous membrane
2A Nickel foil
2B Nickel foil
3A Glass plate
3B Glass plate
4 Electrical Resistance measurement apparatus
5 Thermocouple
6 Thermometer
7 Data collector
8 Oven

The invention claimed is:

1. A microporous membrane consisting of one or more layers, wherein each of the one or more layers has a composition including a polyolefin resin and inorganic particles, wherein the inorganic particles have a primary particle diameter of 100 nm or less, the content of the inorganic particles is 10% by weight or more and less than 40% by weight based on the weight of the microporous membrane, a retention time at 145° C. is more than 1 second and less than 300 seconds in the following thermal behavior evaluation (2) of the microporous membrane:
  thermal behavior evaluation (2) whereby under a condition of an initial load of 0.0098 N (1.0 gf), thermomechanical analysis (TMA) of the microporous membrane is carried out by increasing a temperature of the microporous membrane from 30° C. to 145° C. at a rate of 10° C./minute in a constant length mode, and subsequently holding at 145° C. for 10 minutes, provided that in the thermomechanical analysis (TMA), the time after reaching 145° C. until a shrinkage stress of the microporous membrane falls less than 0.0098 N (1.0 gf) is regarded as a retention time at 145° C., a moment of the shrinkage stress being less than 0.0098 N (1.0 gf) is regarded as breakage of the microporous membrane, and the retention time at 145° C. is used as an index for the thermal behavior evaluation (2), and
  wherein the microporous membrane has an air permeability that is 2 s/100 cc/μm or more and less than 6 s/100 cc/μm.

2. The microporous membrane according to claim 1, wherein in the thermal behavior evaluation (2), the retention time at 145° C. is 5 seconds or longer and less than 100 seconds.

3. The microporous membrane according to claim 1 or 2, wherein a kinetic coefficient of friction of the microporous membrane in MD or TD is 0.25 or more and 0.7 or less.

4. The microporous membrane according to claim 1, wherein a thermal shrinkage in TD at 120° C. is −2% or more and 5% or less.

5. The microporous membrane according to claim 1, wherein a ratio (Rmelt/R35) of an alternating current electrical resistance (Rmelt) when the microporous membrane is held for 30 minutes at a melting point of the microporous membrane to an alternating current electrical resistance at 35° C. (R35) is 0.7 or more and 2.5 or less.

6. The microporous membrane according to claim 1, wherein a ratio (Rmelt+10/R35) of an alternating current electrical resistance (Rmelt+10) when the microporous membrane is held for 1 hour at a temperature of 10° C. higher than a melting point of the microporous membrane to an alternating current electrical resistance at 35° C. (R35) is 0.7 or more and 3.0 or less.

7. The microporous membrane according to claim 1, wherein the polyolefin resin is polyethylene or a mixture of polyethylene and polypropylene.

8. The microporous membrane according to claim 1, wherein the polyolefin resin contains at least one selected from the group consisting of:
  polyethylene having a viscosity-average molecular weight of less than 1,000,000 and
  ultrahigh molecular weight polyethylene having a viscosity-average molecular weight of 1,000,000 or more and a density of 0.942 g/cm$^3$ or less.

9. The microporous membrane according to claim 8, containing polypropylene as the polyolefin resin.

10. The microporous membrane according to claim 1, wherein a primary particle diameter of the inorganic particles is greater than 7 nm.

11. A separator for electricity storage devices, comprising the microporous membrane according to claim 1.

12. The separator for electricity storage devices according to claim 11, comprising an inorganic coating layer or an adhesive layer which is disposed at least on one side of the microporous membrane.

13. An electrochemical device, containing the separator for electricity storage devices according to claim 11.

14. An electrochemical device, containing the separator for electricity storage devices according to claim 12.

15. The microporous membrane according to claim 1, wherein the microporous membrane has an air permeability that is 2 s/100 cc/μm or more and less than 4 s/100 cc/μm.

16. The microporous membrane according to claim 1, wherein the microporous membrane consists of one layer having the composition.

* * * * *